US012677195B2

(12) United States Patent
Dees et al.

(10) Patent No.: US 12,677,195 B2
(45) Date of Patent: Jul. 7, 2026

(54) ENHANCED RATE SIGNALING IN WIRELESS NETWORKS WITH RELAY FUNCTION

(71) Applicant: KONINKLIJKE PHILIPS N.V., Eindhoven (NL)

(72) Inventors: Walter Dees, Einhoven (NL); Esko Olavi Dijk, Utrecth (NL); Jesus Gonzalez Tejeria, Eindhoven (DE)

(73) Assignee: Koninklijke Philips N.V., Eindhoven (NL)

( * ) Notice: Subject to any disclaimer, the term of this patent is extended or adjusted under 35 U.S.C. 154(b) by 302 days.

(21) Appl. No.: 18/025,976

(22) PCT Filed: Sep. 14, 2021

(86) PCT No.: PCT/EP2021/075146
§ 371 (c)(1),
(2) Date: Mar. 13, 2023

(87) PCT Pub. No.: WO2022/058290
PCT Pub. Date: Mar. 24, 2022

(65) Prior Publication Data
US 2023/0354103 A1 Nov. 2, 2023

(30) Foreign Application Priority Data

| Sep. 15, 2020 | (EP) | .................................... | 20196334 |
| May 19, 2021 | (EP) | .................................... | 21174561 |
| Aug. 16, 2021 | (EP) | .................................... | 21191542 |

(51) Int. Cl.
*H04W 28/22* (2009.01)
*H04W 88/04* (2009.01)

(52) U.S. Cl.
CPC ............ *H04W 28/22* (2013.01); *H04W 88/04* (2013.01)

(58) Field of Classification Search
None
See application file for complete search history.

(56) References Cited

U.S. PATENT DOCUMENTS

| 2012/0155363 A1* | 6/2012 | Moon | ................... | H04W 72/30 |
| | | | | 370/312 |
| 2016/0142934 A1* | 5/2016 | Ahmadzadeh | ........ | H04W 28/06 |
| | | | | 370/328 |

(Continued)

FOREIGN PATENT DOCUMENTS

| EP | 2066084 A1 | 6/2009 |
| EP | 3051736 A2 | 8/2016 |

(Continued)

OTHER PUBLICATIONS

ETSI ETSI "5G NR Medium Access Control (MAC) Protocol Specification" Sep. 1, 2018.

(Continued)

*Primary Examiner* — Andre Tacdiran

(57) ABSTRACT

In cellular or other wireless networks, relay communication devices can be introduced to support an indirect network connection for remote communication devices in out-of-coverage (OoC) areas to thereby extend access device coverage and increase available data capacity for communication devices that may not be in optimal coverage of an access device. For directly connected communication devices, mechanisms for bit rate recommendation, bit rate query and desired bit rate indication are defined. However, these existing mechanisms do not work for communication devices indirectly connected via a relay communication device. It is therefore proposed to determine a new data rate recommendation and/or limit for one or more downstream communication devices at least partly based on an identity of a logical channel indicated in a received recommendation and/or limit.

20 Claims, 6 Drawing Sheets

(56)  References Cited

U.S. PATENT DOCUMENTS

2019/0159229 A1 *   5/2019   Yi ..................... H04W 72/1268
2019/0313414 A1 *  10/2019   Lee ....................... H04W 72/52
2023/0071287 A1 *   3/2023   Ahmad ............... H04L 63/0428

FOREIGN PATENT DOCUMENTS

EP             3255950  A1     12/2017
JP           2012527855  A  *  11/2012
JP           2013197716  A      9/2013
JP           2017514320  A      6/2017

OTHER PUBLICATIONS

International Search Report and Written Opinion from PCT/EP2021/ 075146 mailed Jan. 27, 2022.
[S2-1907204] 3GPP TS 23.501 CR1522 Introduction of the IAB support in 5GS, Jun. 2019.
RFC3168] K. Ramakrishnan et al., The Addition of Explicit Congestion Notification (ECN) to IP, RFC 3168, IETF, 2001. https:// tools.ietf.org/html/rfc3168.

[22.261] 3GPP TS 22.261 v16.7.0, Service requirements for the 5G system; Stage 1, Mar. 2019.
[22.866] 3GPP TR 22.866 v17.0.0, enhanced Relays for Energy Efficiency and Extensive Coverage; Stage 1, Sep. 2019.
[23.287] 3GPP TS 23.287 v16.0.0, Architecture enhancements for 5G System (5GS) to support Vehicle-to-Everything (V2X) services, Sep. 2019.
[23.303] 3GPP TS 23.303 v15.0.0, Proximity-based services (ProSe); Stage 2, Jun. 2017.
[23.501] 3GPP TS 23.501, System Architecture for the 5G System; Stage 2, v16.0.2, Apr. 2019.
[23.733] 3GPP TR 23.733 v15.1.0, Study on Architecture Enhancements to ProSe UE-to-Network Relay , Dec. 2017.
[23.752] 3GPP TR 23.752 draft for v0.2.0, Study on system enhancement for Proximity based Services (ProSe) in the 5G System (5GS), Dec. 2019.
[24.334] 3GPP TS 24.334 v15.1.0, Proximity-services (ProSe) User Equipment (UE) to ProSe function protocol aspects; Stage 3, Dec. 2017.
[24.501] 3GPP TS 24.501 v16.1.0, Non-Access-Stratum (NAS) protocol for 5G System (5GS); Stage 3, Jun. 2019.
3GPP TS 38.321, V15.9.0 (Jul. 2020). "Technical Specification Group Radio Access Network.".

* cited by examiner

FIG. 7

ENHANCED RATE SIGNALING IN WIRELESS NETWORKS WITH RELAY FUNCTION

CROSS REFERENCE TO RELATED APPLICATIONS

This application is a U.S. national phase application of International Application No. PCT/EP2021/075146 filed on Sep. 14, 2021, which claims the benefit of EP Application Serial No. 20196334.5 filed on Sep. 15, 2020 and EP application Ser. No. 21/174,561.7 filed on May 19, 2021 and EP Application Serial No. 21191542.6 filed on Aug. 16, 2021 and are incorporated herein by reference.

FIELD OF THE INVENTION

The invention relates to resource scheduling in wireless networks with relay function, such as—but not limited to—cellular networks with indirect network connections for remote communication devices (e.g. terminal devices such as user equipments (UEs)) which are out of network coverage.

BACKGROUND OF THE INVENTION

Many wireless communication systems use network access devices (such as base stations, Node Bs (eNBs, eNodeBs, gNBs, gNodeBs, ng-eNBs, etc.), access points or the like) to provide geographical service areas where wireless communication devices (e.g. terminal devices such as mobile stations or UEs) communicate with an access device serving a particular geographical service area in which the terminal devices are located. The access devices are connected within a network allowing communication links to be made between the wireless communication devices and other devices. In some circumstances, the communication links are between wireless communication devices that are close to each other. In these situations, it may be desirable to have a direct communication link between two wireless communication devices rather than communicating through an access device. Such direct communication between communication devices is often referred to as device-to-device (D2D) communication or peer-to-peer (P2P) communication. The communication resources (e.g., time-frequency blocks) used for D2D or P2P communication can be a subset of the communication resources used by the communication system for communication between wireless communication devices and access devices or they can be a different set of communication resources (e.g. unlicensed band or millimeter wave band).

An in-coverage (InC) communication device is a communication device that is within the service area of an access device and is capable of communication with the access device. An out-of-coverage (OoC) communication device is typically a communication device that is not within a service area of any access device or that is in the service area of an access device but the access device does not allow access (e.g. because it is a non-public network (NPN) access device). An OoC communication device may use an indirect network connection to an access device. It is noted that a communication device can also be an OoC communication device without having any connectivity.

Resource scheduling may be based on an intricate interplay of multiple scheduling mechanisms and protocols that work alongside each other. A scheduler (which may be located at an access device) is expected to take care for a good agreement between resource allocations and recommended bit rate values that it sends to communication devices. At physical layer, resources are typically scheduled at a very fine-grained level, i.e. per frame/subframe or even smaller resource units. At higher layers, the scheduling is typically defined in terms of quality-of-service (QoS) profiles, priorities, etc. In a particular example, 3GPP has defined a concept called Recommended Bit rate at the MAC layer (see 3GPP specification TS 38.321). This rate has a default averaging window of two seconds and is provided to each UE connected to the access device, and is meant for a specific logical channel. The use of this MAC mechanism allows the access device to indicate in a fairly dynamic manner (e.g. not to generate too much data to be transferred), or shift the balance between UEs or between certain logical channels (e.g. because another UE or another channel gets temporarily a higher priority to transmit or receive data). This in turn will have to lead to adhering to a higher layer QoS profile, e.g., to guarantee a certain bitrate for a longer period of time for several UEs. The physical layer scheduler needs to take the MAC recommended bit rate into account. For example, a scheduler could allocate a persistent schedule to a specific communication device which means this communication device is granted periodically recurring resources, that enable it to send data at a bit rate of approximately the value recommended to it.

Various core network (CN) functions for data rate control and limitation are provided. However, these mechanisms do not consider data rate recommendation, control or limitation in the context of radio access network (RAN) and relay communication devices. For good system operation, control mechanisms on both RAN and CN are needed as each has their unique requirements.

Moreover, in the area of bit rate (data rate) recommendation for wireless networks in which relay functions for communication between communication devices and the wireless network are enabled, these relay functions may enable single-hop and/or multi-hop indirect network connections for remote communication devices. A remote communication device is a communication device that is indirectly connected to a core network via one or more relay functions. In such networks, a problem is that the RAN mechanisms for recommending bit or data rates do not work anymore for indirectly connected communication devices. This means that these communication devices cannot query an access device for a bit rate recommendation and cannot receive a bit rate recommendation from the access device.

As a result, an indirectly connected communication device has no information about what bit rate it could expect from the access device for a particular logical channel, the access device has no information about what bit rate a particular indirectly connected communication device would like to use for a particular logical channel, the access device has no way to influence an indirectly connected communication device that is a data source to go to a lower (or higher) bit rate, and/or the indirectly connected communication device has no direct way to influence the access device to obtain a higher bit rate in case it needs that and to signal which rate would be desired.

SUMMARY OF THE INVENTION

It is an object of the present invention to provide an extended rate recommendation procedure that also considers indirectly connected communication devices in wireless networks.

This object is achieved by an apparatus as claimed in claim 1, by a relay communication device as claimed in claim 14, by a wireless communication system as claimed in claim 15, by a method as claimed in claim 16, and by a computer program product as claimed in claim 17.

According to a first aspect, an apparatus is provided for controlling scheduling of communication resources to communication devices at a relay communication device in a wireless network, wherein the apparatus is configured to:

receive from an access device of the wireless network or an upstream relay communication device of the relay communication device a received data rate recommendation and/or limit being one of an aggregate data rate recommendation and/or limit indicating a logical channel pertaining to at least two communication devices or at least two logical channels of a communication device, or a data rate recommendation and/or limit for a logical channel that has been assigned to one or more downstream devices by the relay communication device;

determine a new message including data rate recommendation and/or limit for one or more downstream communication devices at least partly based on an identity of the logical channel; and transmit the determined new message including data rate recommendation and/or limit to at least one of the one or more downstream communication devices.

According to a second aspect, a method of controlling scheduling of communication resources to communication devices in a wireless network is provided, wherein the method comprises:

receiving from an access device or an upstream relay communication device of the wireless network a received data rate recommendation and/or limit being one of an aggregate data rate recommendation and/or limit indicating a logical channel pertaining to at least two communication devices or at least two logical channels of a communication device, or a data rate recommendation and/or limit for a logical channel that has been assigned to one or more downstream devices by the relay communication device;

determining a new data rate recommendation and/or limit for one or more downstream communication devices at least partly based on an identity of the logical channel; and transmitting the determined new data rate recommendation and/or limit to at least one of the one or more downstream communication devices.

According to a third aspect, a relay communication device for a wireless network is provided, which comprises an apparatus of the first aspect.

According to a fourth aspect, a wireless communication system comprising a relay communication device of the third aspect and an access device is provided, wherein the access device is configured to receive from the relay communication device an aggregate desired data rate for a logical channel, and to determine based on an identity of the logical channel to which downstream communication devices the aggregate desired data rate applies.

Finally, according to a fifth aspect, a computer program product is provided, which comprises code means for producing the steps of the above method of the second aspect when run on a computer device.

Accordingly, an enhanced rate signaling for wireless networks with relay functions is provided, that has the following advantages:

1. An indirectly connected (remote) communication device can adapt the data rate of its produced data to a rate that can be supported by the access device and also by all intermediate relay communication devices, based on a recommendation of the access device.

2. The access device or scheduler can adapt its resource schedule to accommodate the expected data rates between the access device and all indirectly connected communication devices, because the expected data rates can now be signaled by these communication devices.

3. The access device can efficiently communicate about data rate recommendations with its directly connected relay communication devices in the same way as it communicates with regular, directly connected non-relay communication devices.

4. Remote communication devices can send their bit rate recommendation queries and receive bit rate recommendations, in the same way as if they were directly connected to the access device, which avoids additional implementation complexity at the remote communication device side.

5. An improved scheduling can be performed by the access device and a reduction of data losses and/or relay buffer overflows in the network can be achieved.

6. Data producing communication devices can optimally adapt their generated data rate to what the network can support instead of learning this rate by trial and error.

It is to be noted that the determination of a new data rate recommendation and/or limit includes the updating of the data rate recommendation and/or limit and/or the including (a copy of) a received data rate recommendation and/or limit into a new message. The value of the new data rate recommendation and/or limit may be the same as the previous recommendation and/or limit, or may be changed as will be detailed in the following embodiments. Therefore, the new data rate recommendation and/or limit may be different but not necessarily. One example of a case where a new data rate recommendation is determined is choosing a new data rate recommendation value based on a pre-configured policy. Another example is the case that a message header is added to a received data rate recommendation to form the new (updated) data rate recommendation. Another example of such case is when a message header of a received data rate recommendation is partly updated or replaced to form the new (updated) data rate recommendation. Yet another example of such case is when additional identity information (e.g., a UE identifier) or context information (e.g., a validity time period) is added to a received data rate recommendation to form the new (updated) data rate recommendation. Similar examples to the ones before can be applied to the case of determining a new data rate limit by updating a received data rate limit. A further example of determining a new data rate recommendation is receiving a message that includes a data rate recommendation and a data rate limit, and removing the data rate limit to form the new data rate recommendation. Another example is receiving a message that includes a data rate recommendation, and combining this with a received or determined data rate limit to form the new data rate recommendation and limit.

In case a downstream communication device receiving the new recommendation and/or limit is itself a relay communication device, the new recommendation and/or limit may be an aggregate recommendation and/or limit for the downstream communication device and all its downstream (e.g., child) communication devices. Assigning a logical channel to one or more downstream devices by the relay communication device can be achieved by one or more of the following procedures:

a) The relay communication device may assign a new upstream logical channel, identified by a new logical channel identity (e.g. LCID), to a downstream communication device e.g. to cater for the indirect connection from the downstream communication device(s) and hence be able to transport the relayed data to/from the downstream communication device(s). Assigning such new upstream logical channel may be done when the relay communication device receives from a downstream communication device a request to create a new logical channel between the downstream communication device and the relay communication device (e.g. through a (in)direct communication request) for relay purposes, or receives a logical channel identity (e.g. LCID) or a logical channel identity mapping related to one or more logical channels that have been created between two or more downstream communication devices. This new logical channel identity may have a different identifier value as the logical channel identity received from the downstream communication device, but if not already in use, the logical channel identity may have the same value as the logical channel identity received from the downstream communication device. The relay communication device may keep a mapping table including a mapping between the logical channel identity received from the downstream communication device and the logical channel identity used for the new upstream logical communication channel. The relay communication device may request to the upstream access device or upstream relay communication device, a desired data rate for the new upstream logical channel based on the requested desired data rate received from the downstream communication device. Optionally, it may report to the upstream access device or upstream relay communication device, the downstream communication device identifier(s) related to a logical channel identity, the requested desired data rate received from the downstream communication device(s), a recommended data rate (currently) being used for a certain logical channel identity, and/or the logical channel identity or identities to which the new logical channel identity applies and/or a mapping of logical channel identities to other logical channel identities. Even though the value of the logical channel identity may be the same, they are between different devices (e.g. uplink instead of sidelink). The upstream access device or parent relay communication device may send a data rate recommendation and/or limit indicating the new logical channel identity, and by doing so it may trigger the relay communication device to derive/determine a new data rate recommendation and/or limit for the downstream communication device.

b) The relay communication device may assign an existing logical channel for upstream communicating between the relay communication device and the access device or upstream relay communication device, identified by an already existing logical channel identity to a downstream communication device, e.g., to cater for the indirect connection from the downstream communication device(s) and hence be able to transport the relayed data to/from the downstream communication device(s). Assigning such existing logical channel to a downstream communication device may be done when the relay communication device receives from a downstream communication device a request to create a new logical channel between the downstream communication device and the relay communication device (e.g. through a (in)direct communication request) for relay purposes, or receives a logical channel identity or logical channel identity mapping related to one or more logical channels that have been created between two or more downstream communication devices. The relay communication device may keep a mapping table indicating a mapping between the logical channel identity received from the downstream communication device and the existing logical channel identity used for the existing upstream logical channel. The mapping may also include logical channel identities from other downstream communication devices assigned to the same existing logical channel, and/or received recommended data rates for the existing logical channel identity and/or existing desired data rate(s) for the logical channel identities from the downstream communication devices. The relay communication device may report to the upstream access device or upstream relay communication device, the logical channel identity of the existing logical channel to which the received logical channel identity was mapped, and optionally a set of downstream communication device identifier(s) related to a logical channel identity, the requested desired data rate received from the downstream communication device, or an aggregate thereof, a recommended data rate and/or limit (currently) being used for a certain logical channel identity, and/or the received logical channel identity from the downstream communication device and/or a mapping of logical channel identities to other logical channel identities. The relay communication device may request to the upstream access device or upstream relay communication device, a new desired data rate for the existing upstream logical channel based on an aggregate of the requested desired data rate received from the downstream communication device and the existing desired data rate(s) for the existing upstream logical channel (i.e. based on logical channel identities from other downstream communication devices assigned to the same existing logical channel). The upstream access device or upstream relay communication device may send a new data rate recommendation and/or limit indicating the logical channel identity of the existing logical channel, and by doing so it may trigger the relay communication device to derive/determine a new data rate recommendation for the downstream communication device.

c) The relay communication device may assign a new/different logical channel identity for a logical channel between a downstream communication device and the relay communication device, or between two downstream communication devices, in case the logical channel identity is already used for another logical channel. The relay communication device may in this case play the role of a kind of central registry/broker for all the downstream logical channel identities. Assigning such a new upstream logical channel may be done when the relay communication device receives from a downstream communication device a request to create a new logical channel (e.g. through a (in)direct communication request) or receives a logical channel identity or a logical channel identity mapping related to one or more logical channels that have been created or are about to be created between two or more downstream communication devices. The relay communication device may assign the received logical channel identity from the downstream communication device to a new/different logical channel identity value in case it conflicts with another identity value of a logical channel for another downstream communication device. To this end, the relay communication device may keep a mapping table between the logical channel identities received from the different downstream communication devices and downstream communication device identities, to make sure no overlapping logical channel identity values are used, or to track for each logical channel identity the downstream communication device identities which use the same logical channel identity values, in order to keep track of the overlap and make sure the aggregation/disaggregation is done correctly. In case the relay communication device assigns a new/different logical channel identity value, the relay communication device may request the downstream communication device to use the new/different logical channel identity value instead. The relay communication device may report to an upstream access device or an upstream relay communication device the logical channel identity to which the received logical channel identity has been assigned and may indicate that this logical channel identity is used for downstream and/or upstream and/or sidelink communication. In addition, it may report downstream communication device identifier(s), the requested desired data rate received from the downstream communication device(s), or an aggregate thereof, a recommended data rate (currently) being used for a certain logical channel identity, and/or a mapping of logical channel identities to other logical channel identities. Optionally, it may report all non-overlapping logical channel identities (and their desired data rates) of all logical channels between the relay communication device and its downstream devices and between all its downstream communication devices, or may report the mapping it keeps between logical channel identities and communication device identifiers that are involved in the logical channel identified by the logical channel identity or it may report the mapping from received logical channel identities to assigned logical channel identities. This allows a scheduling entity in an upstream access device or an upstream relay communication device to identify each logical channel used between all downstream communication devices individually. The upstream access device or upstream relay communication device may send a new data rate recommendation and/or limit for the logical channel identity that is assigned to the downstream communication device, and by doing so it may trigger the relay communication device to derive/determine a new data rate recommendation for the downstream device.

Some of the reasons why the relay communication device may need to create a new data rate recommendation for the downstream device are e.g. because the logical channel identity that is assigned by the relay communication device may be different from the logical channel identity that is used by the downstream communication device (e.g. as stored in a mapping table for mapping received logical channel identities to assigned logical channel identities), or because multiple downstream communication devices reported the same logical channel identities and are assigned the same overlapping logical channel identity value (e.g. as stored in a mapping table for mapping received logical channel identities to downstream communication device identifiers), or because it has multiple other downstream communication devices it needs to serve through the same upstream logical channel, or because it has multiple downstream communication devices it needs to serve through the same sidelink logical channel (e.g. if the downstream communication device that is served through the sidelink logical channel is a relay communication device connected to multiple downstream communication devices), or because it can temporarily not achieve the desired data rate, or because it needs to balance its data rates between different downstream communication devices. Determining a new data rate recommendation and/or limit may involve the creation of a new message, the new message including a new data rate and/or limit, and/or including a different logical channel identity than the logical channel identity of the logical channel for which the (aggregate) data rate recommendation was received from an access device or upstream relay communication device, and/or including a different destination than the message received from the access device or upstream relay communication device containing the (aggregate) data rate recommendation.

According to a first option which may be combined with any of the above first to fifth aspects, the new data rate recommendation and/or limit may be determined to be less than or equal to the received data rate recommendation and/or limit. This allows to schedule a portion of the aggregate data rate recommendation and/or limit to the relay communication device itself. It also allows, for example, to distribute a received aggregate recommendation between multiple downstream communication devices without keeping anything for the relay communication device itself.

According to a second option which may be combined with the first option or any of the above first to fifth aspects, the aggregate data rate recommendation and/or limit may comprise indicator data that indicates whether the aggregate recommendation and/or limit applies to an upstream data flow or a downstream data flow. Thereby, scheduling can be separated for upstream and downstream, which leads to a more efficient schedule for both. By distinguishing the upstream and downstream direction (e.g. by a flag) in the recommendation and/or limit message, the resource scheduling by the access device can be made more efficient and more fine-tuned with separate data flow recommendations and/or limits for upstream and downstream.

According to a third option which can be combined with the first or second option or any of the above first to fifth aspects, a request for an aggregate desired data rate for a logical channel may be sent to the access device or the upstream relay communication device of the relay communication device. Thus, data rate requests from downstream remote communication devices can be collected at the relay communication device and signaled to the access device or the upstream relay (parent) communication device.

According to a fourth option which can be combined with any of the first to third options or any of the above first to fifth aspects, the request for an aggregate desired data rate for a logical channel may be triggered by and at least partly based on at least one request for a desired data rate received from one of the one or more downstream communication devices. This measure allows to provide a trigger mechanism for aggregate desired data rate request, which can be based on individual data rate requests of remote communication devices.

According to a fifth option which can be combined with any of the first to fourth options or any of the above first to fifth aspects, a request for a desired data rate for a logical channel may be received at the relay communication device from one of the one or more downstream communication devices, wherein a data rate recommendation and/or limit for the logical channel may be determined at the relay communication device based on the received request, and the determined data rate recommendation and/or limit may be used by the relay communication device to respond to the request. Thereby, the relay communication device may directly respond to desired data rate requests from remote communication devices.

According to a sixth option which can be combined with any of the first to fifth options or any of the above first to fifth aspects, the relay communication device may be configured to look up in an internal table a corresponding downstream communication device and/or an identity of a second logical channel for which to send a new data rate recommendation and/or limit to the downstream communication device in response to a data rate recommendation and/or limit received from the access device or the upstream relay communication device of the relay communication device and indicating an identity of a first logical channel, or the relay communication device may be configured to look up in the internal table an identity of a second logical channel for which to send a new request for a desired data rate to the access device or an upstream relay communication device of the relay communication device in response to a request for a desired data rate received from one of the one or more downstream communication devices and indicating an identity of a first logical channel. Thereby, logical channel mapping can be applied at the relay communication device in upstream and/or downstream direction to identify target devices for signaling recommendations, limits or desired data rates.

According to a seventh option which can be combined with any of the first to sixth options or any of the above first to fifth aspects, the relay communication device may be configured to create an additional logical channel on a wireless link with the access device or an upstream relay (e.g. its parent) communication device when it determines that a new logical channel has been created for a communication link with one of the one or more downstream communication devices. This measure ensures that channel mapping options are provided for all available logical channels. E.g., a child communication device may create a new logical channel and in response the parent relay communication device adds a new logical channel on the upstream link.

Since a relay could have multiple parent communication devices, the new logical channel may be created towards a first parent communication device while the aggregate recommendations are received from a second parent communication device. This can be achieved e.g. by the 3GPP Dual Connectivity mode (cf. 3GPP specifications TS 23.504, TS 38.300 and TS 37.340), which is a mode of operation where a multiple receiver (Rx)/transmitter (Tx) capable UE in RRC Connected mode can be configured to utilize the radio resource of two distinct schedulers located in two access devices, namely Master gNB and Secondary gNB. In an example, logical channel identities (e.g. for a multi-hop relay topology) may be centrally assigned (e.g. by a "root" relay communication device) to make sure they don't overlap. To this end, identity information of communication devices related to each logical channel identity may need to be communicated to the central assigning device (e.g. the "root" relay communication device). Thereby, a one-to-one channel mapping can be provided to improve signalling efficiency. This mapping (or parts thereof) may also be transmitted to an upstream access device or relay communication device, which allows the upstream access device or relay communication device to identify each downstream logical channel individually. Possibly, this mapping may be sent together with or the mapping may be extended with a desired (aggregate) recommended data rate or a recommended data rate being used for each logical channel identity as further input for the upstream access device or relay communication device.

According to an eighth option which can be combined with any of the first to seventh options or any of the above first to fifth aspects, the internal table may be configured to map an identity of a logical channel between the relay communication device and the access device or the upstream relay (e.g. its parent) communication device to a plurality of identities of logical channels between the relay communication device and the one or more downstream communication devices. Thereby, a one-to-many channel mapping can be provided to improve signaling efficiency.

Alternatively, a one-to-many mapping may be provided, that maps each logical channel identity to an identifier of the communication device that created the logical channel identity or to a set of identifiers of communication devices that are involved in the logical channel identified by the logical channel identity. This mapping (or parts thereof) may also be transmitted to an upstream access device or relay communication device, which allows the upstream access device or relay communication device to identify each downstream logical channel individually. Possibly, this mapping may be sent together with or the mapping may be extended with a desired (aggregate) recommended data rate or a recommended data rate being used for each logical channel identity as further input for the upstream access device or relay communication device.

According to a ninth option which can be combined with any of the first to eighth options or any of the above first to fifth aspects, the data rate recommendation and/or limit may be transmitted using at least one of Medium Access Control protocol, Radio Link Control protocol, Packet Data Convergence Protocol, Radio Resource Control protocol, and Service Data Adaptation Protocol. Thus, a flexible rate signaling on different protocol levels can be provided.

According to a tenth option which can be combined with any of the first to ninth options or any of the above first to fifth aspects, the relay communication device may be configured to collect information about at least one desired data rate received from the one or more downstream communication devices, to transmit the collected information to the upstream relay communication device or the access device, to receive a received data rate recommendation and/or limit from the upstream relay communication device or the access device, and to distribute the received data rate recommendation and/or limit at least partially among the one or more downstream communication devices using a predetermined policy. This measure allows to control the distribution of the aggregate data rate recommendation and/or limit among downstream communication devices at the relay communication device.

According to an eleventh option which can be combined with any of the first to tenth options or any of the above first to fifth aspects, the relay communication device may be configured to select the predetermined policy based on at least one of a quality indicator of a logical channel of the relay communication device, a number of downstream communication devices of a relay communication device, a number of upstream communication devices of a relay communication device, a type of downstream communication device, a policy selection information received from an upstream communication device or the access device, a quality of service identifier, a network slice identifier, and a buffer status of the relay communication device. Thereby, a flexible distribution of the aggregate data rate recommendation and/or limit to downstream communication devices based on different criteria defined by the selected policy can be implemented.

According to a twelfth option which can be combined with any of the first to eleventh options or any of the above first to fifth aspects, the apparatus is configured to determine a further new data rate recommendation and/or limit for one or more downstream communication devices triggered by loss of a communication link between the relay communication device and at least one other communication device, or by a determination that said communication link is to be stopped; and transmit the further new data rate recommendation and/or limit to at least one downstream communication device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, the relay communication device of claim 13, the wireless communication system of claim 14, the method of claim 15, and the computer program product of claim 16 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 7 schematically shows a network architecture with one-to-many channel mapping according to an embodiment;

DETAILED DESCRIPTION OF EMBODIMENTS

Figures 1, 2:
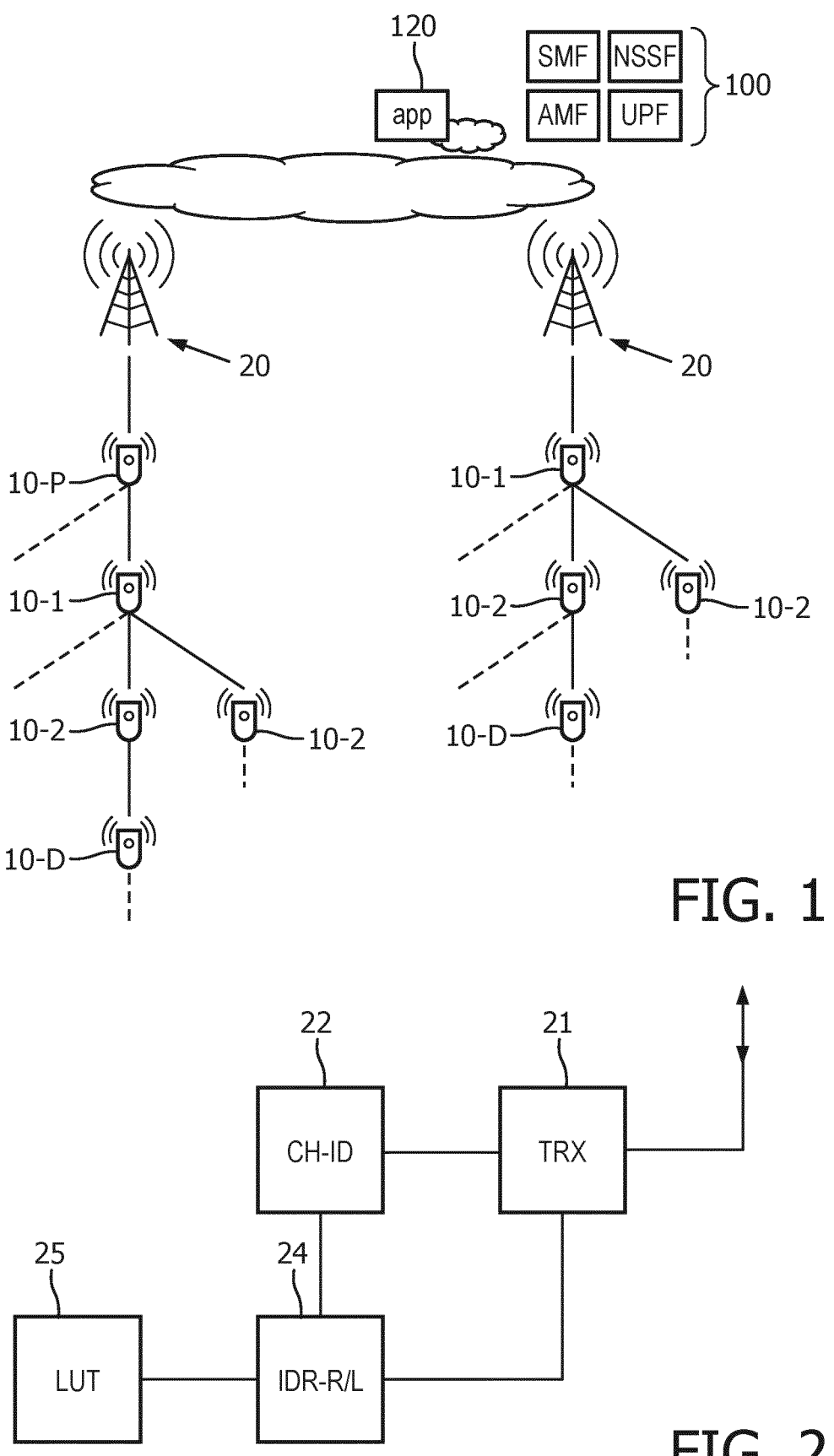
FIG. 1 schematically shows a network architecture in which the present invention can be implemented.
FIG. 2 schematically shows a block diagram of an access device according to various embodiments.

Embodiments of the present invention are now described based on a resource scheduling for 5G cellular networks in which UE-to-network relay functions are enabled, where 4G network elements may be incorporated in the proposed 5G solutions. Furthermore, at least some of the below embodiments are described based on a 5G New Radio (5G NR) radio access technology. Specifically, the relay functions enable multi-hop indirect network connections for remote communication devices (e.g. UEs). This is done to achieve improved coverage for communication devices and improved low-power operation for IoT communication devices specifically.

Throughout the present disclosure, the abbreviations "eNB" (4G terminology) and "gNB" (5G terminology) are intended to mean access device such as a cellular base station or a WiFi access point. A gNB may consist of a centralized control plane unit (gNB-CU-CP), multiple centralized user plane units (gNB-CU-UPs) and/or multiple distributed units (gNB-DUs). The eNB/gNB is part of the radio access network (RAN), which provides an interface to functions in the core network (CN). The RAN is part of a wireless communication network. It implements a radio access technology (RAT). Conceptually, it resides between a communication device such as a mobile phone, a computer, or any remotely controlled machine and provides connection with its CN. The CN is the communication network's core part, which offers numerous services to customers who are interconnected via the RAN. More specifically, it directs communication streams over the communication network and possibly other networks. In the 3GPP specifications TS 23.303 and TS 24.334 for 4G networks, so-called proximity service (ProSe) functions are defined to enable—amongst others—connectivity for cellular communication devices (e.g UEs) that are temporarily not in coverage of an access device (eNB). This particular function is called ProSe UE-to-network relay, or Relay UE. The Relay UE is a relay communication device that helps another OoC UE (i.e. indirectly connected remote communication device) to communicate to the eNB (i.e. access device) by relaying application and network data traffic in two directions (upstream and downstream) between the OoC UE and the eNB. The local communication between the Relay UE and the OoC UE is called D2D communication or Sidelink communication or PC5 communication. The abbreviation "PC5" designates an interface for sidelink communication as defined by ProSe and in 5G networks also used to denote sidelink communication for V2X (cf. 3GPP specification TS 23.287/TR 37.985). Furthermore, the abbreviation "UL" is used for the uplink direction from the communication device (e.g. UE) to the access device (e.g. eNB, gNB), the abbreviation "DL" for the downlink direction from the access device (e.g. eNB, gNB) to the communication device (e.g. UE), and the abbreviation "SL" for sidelink communication between two or more communication devices (e.g. UEs).

Furthermore, the term "logical channel" generally denotes a layer-2 logical channel. In embodiments, the logical channel may be for example a MAC logical channel, an RLC channel (i.e. RLC bearer), or a radio bearer implemented by a PDCP entity.

Once the relaying relation is established, the OoC UE is connected via the Relay UE and acts in a role of "Remote UE". In general, a UE can connect to the network directly (direct network connection), or by using another UE as a relay UE (indirect network connection), or by using both types of connections. The term "upstream" is used for data destined towards an access device or to indicate a communication device that is closer (in terms of number of hops) to an access device, while the term "downstream" is used for data flows from an access device destined towards a communication device in the RAN or to indicate a communication device that is further away (in terms of number of hops) from an access device. A prefix "parent" denotes an upstream relay communication device being used by a remote or relay communication device, and a prefix "child" denotes a downstream relay communication device that is directly connected (e.g. via a single wireless link) to a given relay communication device, or a downstream remote communication device that is directly using a particular relay communication device as a parent.

Ongoing standardization work (e.g. 3GPP specification TR 22.866 v17.1.0) extends the concept of single-hop relay to support communication over multiple wireless hops and the use of relays for commercial or IoT application areas. ProSe Release 15 only allows relay communication devices that provide a single hop towards the network (access device), to enable a remote communication device to have an indirect network connection to the access device (e.g. eNB) and the 4G CN. 3GPP Release 17 will define how ProSe including relays will operate in 5G networks, when using 5GS (5G System) and/or NR radio access technology. For Release 18 or later, the aim is to enable multi-hop relaying for 5GS, where Relay UEs can be connected to other Relay UEs and so on.

Furthermore, 3GPP specifications TR 23.733 v15.1.0 and TR 36.746 v15.1.1 provide studies on architectural enhancements e.g. to enable an IoT device (in a role of Remote UE) to operate on very low power by using a Relay UE to connect to the wider network. Because the Relay UE is physically very close, it can be reached using very low power transmissions. This work also includes security, speed and stability improvements to ProSe. These extensions of ProSe are called enhanced ProSe ("eProSe").

One proposed improvement in eProSe is an enhanced relaying architecture that operates in the second protocol layer (i.e. L2). The new L2 architecture intended to offer end-to-end Internet Protocol (IP) packet and Packet Data Convergence Protocol (PDCP) packet transmissions to remote communication devices for application and/or user data. A benefit of this architecture is that the remote communication devices becomes directly visible as a registered entity in the CN, which is relevant for monitoring and billing purposes and for improved control by the access device over the communication device. The Remote UE can access all functions of the CN and access device (e.g. gNB), as if it were directly connected.

Furthermore, there is also an alternative proposal for Layer 3 (L3) relaying in ProSe 5G, which keeps the relaying mechanism similar to how it was in 4G. There is no control plane stack defined yet in 3GPP documents for L3 relaying. Typically, it is left out since the Remote UE in this solution does not have a Control Plane connection with the CN but only to its Relay UE.

An element for implementing scheduling mechanisms may be the Radio Resource Control (RRC) protocol which can operate end-to-end to UEs, potentially over one or more hops taking into consideration the above new relay architecture on the second protocol layer (i.e. L2). It may be used for non-time-critical, static or semi-static schedule information. In other words, the configuration of schedules. Here, ConfiguredGrantConfig may be an information element for uplink or sidelink scheduling.

Another element for implementing scheduling mechanisms may be control elements (CEs) of the Media Access Control (MAC) protocol, which are short elements (or information elements (IEs)) inserted between existing UL/DL/SL transmissions over the MAC layer, used to efficiently signal certain events, measurements or configurations. Further MAC CEs may be used by the access device (e.g. gNB) to control the behavior of the communication device (e.g. UE) when executing various other 3GPP mechanisms such as Channel State Information (CSI) reporting, Sounding Reference Signals (SRS), or Discontinuous Reception (DRX).

A further element may be the use of a downlink control information (DCI), which is a short message sent in a low-bitrate control channel (e.g. Physical Downlink Control Channel (PDCCH)) with a special blindly detectable modulation or coding. This mechanism is implemented at the physical protocol layer (PHY L1) and does not need to use the MAC PDU header structure. Here, various DCI formats can be defined with different information content. Communication resources for dynamic scheduling can be indicated in the DCI. A DL data transmission may follow the DCI message after e.g. less than 1 ms but can be scheduled for up to 4 ms ahead. For UL, the scheduling may be made for a next time slot 1-2 ms ahead but can be up to 8 ms ahead.

A still further element may be the use of uplink or sidelink control information (UCI, SCI). This may include a scheduling request (SR) bit used e.g. when no communication resources are available. In response to an SR, the scheduler of the access device (e.g. gNB) will allocate uplink communication resources for the communication device (e.g. UE) in the future.

The above resource scheduling overview is applicable for communication devices (e.g. UE) and could be used for multi-hop solutions as well. Therefore, according to various embodiments, new network elements may need to be added or the existing elements may need to be extended, as described below. If single- or multi-hop relay communication devices are introduced into a network, then existing solutions may not be sufficient because these may operate on a direct link between the access device (e.g. gNB) and the communication device (e.g. UE), and not necessarily on an indirect link between the access device and the communication device via a relay.

As initially mentioned, the scheduler is expected to take care for a good agreement between resource allocations and recommended bit rate values that it sends to UEs. For example, a scheduler could allocate a persistent schedule to a specific UE which means this UE is granted periodically recurring resources, that enable it to send data at a bit rate of approximately the value the gNB has recommended to the UE.

This can be achieved e.g. by using the Recommended Bit Rate MAC CE as defined in 3GPP specification TS 38.321 v15.5.0, NR. This MAC layer CE can be used in the UL direction to indicate to the gNB/scheduler a desired bit rate of a UE for UL data (originating from the UE) or for DL data (going to UE) for a specific Logical Channel ID (LCID). Furthermore, this MAC layer CE can be used in the DL direction as an indication from the gNB/scheduler of the recommended bit rate for UL data (originating from the UE) or for DL data (going to UE).

The Recommended Bit Rate MAC CE contains an LCID, i.e., a single logical channel for which the request/recommendation holds. The LCID contains a "Bit Rate" field that is 6 bits long, where the bit values are to be interpreted as in the following table:

| Index | NR Recommended Bit Rate value [kbit/s] |
|---|---|
| 0 | Note 1 |
| 1 | 0 |
| 2 | 9 |
| 3 | 11 |
| 4 | 13 |
| 5 | 17 |
| 6 | 21 |
| 7 | 25 |
| 8 | 29 |
| 9 | 32 |
| 10 | 36 |
| 11 | 40 |
| 12 | 48 |
| 13 | 56 |
| 14 | 72 |
| 15 | 88 |
| 16 | 104 |
| 17 | 120 |
| 18 | 140 |
| 19 | 160 |
| 20 | 180 |
| 21 | 200 |
| 22 | 220 |
| 23 | 240 |
| 24 | 260 |
| 25 | 280 |
| 26 | 300 |
| 27 | 350 |
| 28 | 400 |
| 29 | 450 |
| 30 | 500 |
| 31 | 600 |
| 32 | 700 |
| 33 | 800 |
| 34 | 900 |
| 35 | 1000 |
| 36 | 1100 |
| 37 | 1200 |
| 38 | 1300 |
| 39 | 1400 |
| 40 | 1500 |
| 41 | 1750 |
| 42 | 2000 |
| 43 | 2250 |
| 44 | 2500 |
| 45 | 2750 |
| 46 | 3000 |
| 47 | 3500 |
| 48 | 4000 |
| 49 | 4500 |
| 50 | 5000 |
| 51 | 5500 |
| 52 | 6000 |
| 53 | 6500 |
| 54 | 7000 |
| 55 | 7500 |
| 56 | 8000 |
| 57 | Reserved |
| 58 | Reserved |
| 59 | Reserved |
| 60 | Reserved |
| 61 | Reserved |
| 62 | Reserved |
| 63 | Reserved |

Note 1:
For bit rate recommendation message this index is used for indicating that no new recommendation on bit rate is given.

A gNB can send the Recommended Bit Rate MAC CE to a UE based on own decision—to provide a recommendation—and/or a UE can query for a recommendation for a specific LCID by sending the Recommended Bit Rate MAC CE to the gNB, then including a desired bit rate value.

Note that in 5G specifications the Recommended Bit Rate MAC CE is defined in a more generic way than in 4G. In 4G specifications, it was specifically defined as part of the MMtel (multimedia telephony) specific features in 3GPP specification TS 36.331 v15.2.2 as "MMTEL-Parameters-r14" under the general RAN capabilities signalling in RRC. In 5G, it is defined in 3GPP specification TS 38.331 v15.5.1, NR under "MAC-ParametersCommon" under the general RAN capabilities signalling in RRC. Using RRC, the eNB/gNB signals to the UE whether the Recommended Bit Rate MAC CE is supported in upstream direction (as a query towards eNB/gNB) and/or supported in downstream direction (as a recommendation towards UE).

FIG. 1 schematically shows a network architecture with relay communication devices.

In the scenario shown in FIG. 1, a 5G core network (CN) 100 is connected to a plurality of base stations (i.e. gNBs) 20 of a radio access network. First UEs 10-1 are directly or indirectly connected to a respective one of the base stations 20 and act as Relay UEs configured to transport upstream data from two or more downstream UEs 10-D to the respective (serving) base station 20 and downstream data from a respective base station 20 to the two or more downstream UEs 10-D. In case of an indirectly connected first UE 10-1 (left branch in FIG. 1), at least one parent UE 10-P may be connected as Relay UE between the first UE 10-1 and the respective base station 20.

Furthermore, one or more downstream second UEs 10-2 that are in radio range (coverage) of a respective first UE 10-1 are provided, each capable of acting as either Remote UE or Relay UE or both and connecting directly to the respective first UE 10-1 over a wireless link and indirectly to a respective base station 20 via a relay function of the respective first UE 10-1. Dotted lines indicate possible/optional links to further UEs (not shown).

The core network 100 may comprise network functions such as a network slice selection function (NSSF), a user plane function (UPF), a session management function (SMF), and an access and mobility management function (AMF).

According to various embodiments, the base stations 20 or a function in the core network 100 acting via the base stations 20 provides downstream data to the first UEs 10-1 that includes a data rate recommendation and/or limit for a logical channel ID (LCID). This data rate recommendation and/or limit for a single LCID contains an aggregate data rate recommendation and/or limit for at least two UEs. After receiving the aggregate data rate recommendation and/or limit, the first UE 10-1 determines at least partly based on the associated LCID which one(s) of the second UEs 10-2 are to receive a new data rate recommendation and/or limit. Then, the first UE 10-1 provides downstream data to at least one of the second UEs 10-2 which includes a new data rate recommendation and/or limit, which is at least partly based on the received aggregate data rate recommendation and/or limit.

In an example where multiple second UEs 10-2 are provided, the new data rate recommendation and/or limit provided by the first UE 10-1 may comprise a recommendation and/or limit value that is lower than the value of the aggregate recommendation and/or limit included in the received data.

In another example, the new data rate recommendation and/or limit provided by the first UE 10-1 has a recommendation/limit value that is equal to the value of the aggregate data rate recommendation and/or limit included in said received data.

In a further example, the aggregate data rate recommendation and/or limit sent to the first UE 10-1 may comprise indicator data for indicating whether the aggregate data rate recommendation and/or limit applies to an upstream data flow or to a downstream data flow.

In a still further example, a UE can send an aggregate desired data rate request for an LCID to an upstream UE or to a base station 20 that is in its radio range.

In a still further example, at least one of the second UEs 10-2 may be arranged to transmit a desired data rate request for an LCID to a first UE 10-1, wherein the first UE 10-1 may respond to the request with a data rate recommendation and/or limit for that LCID and optionally for one or more other LCID(s).

In a still further example, the first UE 10-1 may be arranged to send a desired data rate request for an LCID to an upstream UE (e.g. parent UE 10-P) or a base station 20 in radio range, where the request is triggered by and at least partly based on at least one desired data rate request received from a second UE 10-2. The upstream desired data rate request may contain a single desired data rate for the LCID, where the single desired rate may be the added total of a plurality of received desired data rates. If a look-up table of recommendation and/or limit values is used in an embodiment, the added total (sum) of desired data rates sent to the upstream UE (e.g. parent UE 10-P or the base station 20) is an approximation (e.g. the lowest value from the table that is at least equal to or larger than the sum of desired data rates).

In an example, the first UE 10-1 (i.e. Relay UE) may receive an aggregate data rate limit of e.g. 1 Mbps from the parent UE 10-P or the base station 20 and may then split this into a first limit (e.g. 500 kbps) to use for itself and a second limit (e.g. 500 kbps) to use for the (one) second UE (i.e. child UE) 10-2. Or, in case of a received aggregate rate recommendation, this may be used for the first UE 10-1 itself (acting in Remote UE role, i.e. data producer/consumer itself, or acting in a regular UE role as data producer/consumer) and a child Remote UE of the first UE 10-1. In FIG. 1, second UEs 10-2 that do not have any further children themselves can be considered as Remote UEs. Of course, any distribution (e.g. 20% for itself and 80% for one downstream UE) may be implemented.

Moreover, a Relay UE may always be enabled to operate as a regular UE in "directly connected" mode too. Also, a Relay UE can be enabled to operate as Remote UE itself. Vice versa, a Remote UE can be enabled to operate as a Relay UE.

The aggregate data rate recommendation and/or limit is interpreted by the first UE 10-1 and based thereon the first UE will generate and send a new data rate recommendation and/or limit to at least one downstream device. In this respect, it is noted that a distinction needs to be made between layer-3 (L3) or higher data (e.g. NAS and user data) which may be forwarded to downstream UEs and layer-2 (L2) MAC-CE elements which are newly created and not forwarded. How the creation works may be dependent on the technical solution for the relay function. In an L2 relay architecture, the first UE 10-1 may also have to add an RLC channel (because RLC acts over just one hop) in order to send a new data rate recommendation. This may be triggered automatically or by an RRC setup procedure. E.g., in a L2 relay solution, the first UE 10-1 may receive an RRC rlc-BearerToAddModList element or a similar element defined for Sidelink RLC channel creation such that it will also create a Radio Link Control (RLC) channel and its associated logical MAC channel ID in response thereto.

Furthermore, the aggregate data rate recommendation and/or limit may be passed downstream hop-by-hop by at least one Relay UE (e.g. the parent UE 10-P of the left branch in FIG. 1) to the first UE 10-1. In such a case, the first UE 10-1 receives aggregate data rate recommendations and/or limits from the base station 20 via the relay function of the at least one Relay UE which could have even been modified by the at least one Relay UE in transit. Thus, the first UE 10-1 may receive its aggregate data rate recommendation and/or limit directly from the at least one upstream Relay UE and may not recognize that it is coming from the base station 20.

In examples, the aggregate data rate recommendation and/or limit may be created by a parent UE 10-P (e.g. MAC CE Recommended Bit Rate like method) or by the access device 20 directly (e.g. sent via RRC over multiple relay hops to the relay UE 10-1). In both cases, a message carrying the aggregate data rate recommendation and/or limit may be sent by the parent UE 10-P to the first UE 10-1 while the creator of the message may differ.

FIG. 2 schematically shows a block diagram of a relay communication device according to various embodiments.

It is noted that only those blocks relevant for the proposed enhanced rate recommendation function are shown in FIG. 2. Other blocks have been omitted for reasons of brevity.

The relay communication device of FIG. 2 may correspond to the first UE 10-1 of FIG. 1 or any other type of relay communication device for any wireless network having a data rate recommendation and/or limitation function.

According to FIG. 2, the relay communication device comprises a transceiver unit (TRX) 21 for transmitting and receiving wireless messages and/or other wireless signals via an antenna. Messages with new data rate recommendations or limits are created by an individual data rate recommendation and/or limit creator (IDR-R/L) 24 based at least partially on a logical channel identity (ID) (e.g. LCID) derived by a channel detector (CH-ID) 22 from an aggregate data rate recommendation and/or limit received by the transceiver unit 21 from an access device (e.g. base station 20 of FIG. 1) or another upstream communication device (e.g. parent UE 10-P of FIG. 1).

Furthermore, the relay communication device comprises a memory with a look-up table (LUT) 25 which provides a mapping table between logical channel IDs of parent (upstream) devices and associated logical channel IDs of child (downstream) devices and/or remote downstream communication devices.

Based on information provided in the mapping table of the look-up table 25 and the aggregate data rate obtained from a received data rate recommendation and/or limit, the individual data rate recommendation and/or limit creator 24 creates a new data rate recommendation and/or limit for at least one of the one or more downstream communication devices and transmits the new data rate recommendation and/or limit through the logical channel with the derived logical channel ID to the derived downstream communication device and/or to the downstream communication device (s) listed in the mapping table in association with the received logical channel ID. The transmission may be directly or indirectly (e.g. over multiple hops, and/or via a network function). The relay communication device may create the new data rate recommendation and/or limit under consideration of its own desired data rate and/or data rate limitation(s).

Thereby, an enhanced data rate recommendation and/or limitation can be provided, by which directly and indirectly connected relay communication devices are jointly considered via the mapping table.

Figure 3:
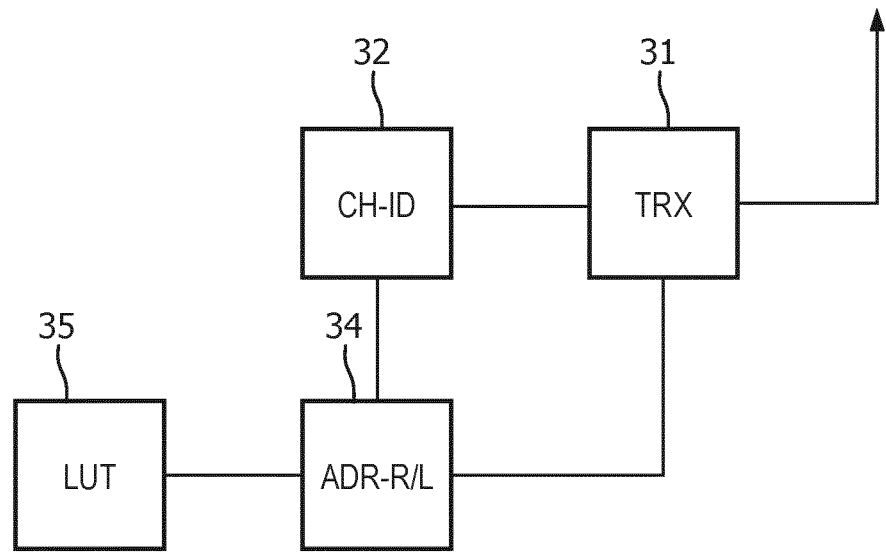
FIG. 3 schematically shows a block diagram of a communication device according to various embodiments.

FIG. 3 schematically shows a block diagram of an access device according to various embodiments.

It is noted that only those blocks relevant for the proposed enhanced recommendation function are shown in FIG. 3. Other blocks have been omitted for reasons of brevity.

The access device of FIG. 3 may correspond to the base station (gNB) 20 of FIG. 1 or any other type of access device for any wireless network having a resource scheduling function.

According to FIG. 3, the access device comprises a transceiver unit (TRX) 31 for transmitting and receiving wireless messages and/or other wireless signals via an antenna. Messages with aggregate data rate recommendations and/or limits are generated by an aggregate data rate recommendation and/or limit creator (ADR-R/L) 34 based on a logical channel ID (e.g. LCID) derived by a channel detector (CH-ID) 32 from an aggregate desired data rate received by the transceiver unit 31 from a downstream communication device. In an example, the access device (e.g. base station (gNB) 20 in FIG. 1) could also send these data rate recommendations and/or limits on its own initiative. In this case the channel detector 32 does not act on received "desired data rate" messages, but on other considerations (e.g. available resources and a fair distribution of those).

Furthermore, the access device comprises a memory with a look-up table (LUT) 35 which provides a mapping table between logical channel IDs and associated directly and indirectly connected remote downstream communication devices. The mapping table may be one table defined per directly connected communication device (e.g. Relay UE). In an example, there can be multiple mapping tables stored at the access device and each directly connected communication device has all logical channels at its disposal for communication with the access device, i.e., there is no competition for logical channel IDs between these communication devices. As an alternative, the mapping table can be implemented as one table for all communication devices. In that case, e.g. there is one entry per communication device and a logical channel identifier for a directly connected communication device can be associated to each table entry and an identifier of a directly connected communication device can be associated to each table entry. Thus, e.g. LCID 4 may be mapped to Remote UEs {x,y,z} for directly connected Relay UE1 and may as well be mapped to different Remote UEs {a,b} for directly connected Relay UE2.

Based on the received logical channel ID and aggregate desired data rate, the aggregate data rate recommendation and/or limit creator 34 creates at least one aggregate data rate recommendation and/or limit for downstream communication devices based on the information in the mapping table and transmits the at least one aggregate data rate recommendation and/or limit through the logical channel with the received logical channel ID. The mapping table is thus used by the access device to derive communication devices to be addressed, if it sends on a particular logical channel ID to a particular directly connected relay communication device. The transmission may be directly or indirectly (e.g. over multiple hops, and/or via a network function).

Thereby, an enhanced data rate recommendation and/or limitation can be provided, by which directly and indirectly connected relay communication devices are jointly considered via the mapping table.

The individual blocks of the block diagrams of FIGS. 2 and 3 may be implemented by discrete hardware circuit(s)

such as application specific integrated circuit(s) (ASIC(s)), programmable logic array(s) (PLA(s)), field programmable gate array(s) (FPGA(s)) or the like, or by digital signal processor(s) (DSP) or other software-controlled processor circuit(s).

Figure 4:
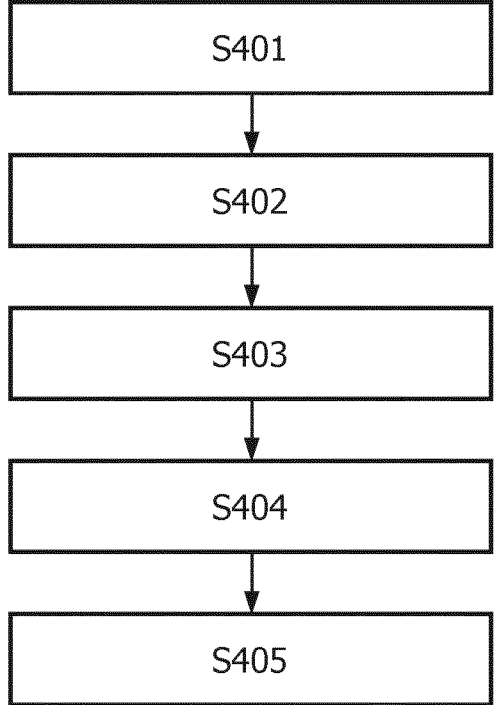
FIG. 4 schematically shows a flow diagram of an enhanced rate recommendation procedure according to various embodiments.

FIG. 4 schematically shows a flow diagram of an enhanced rate recommendation and/or limitation procedure according to various embodiments, which may be implemented at a relay communication device (e.g. first UE 10-1 of FIG. 1) of a cellular or other wireless network.

In a first step S401, the relay communication device receives an aggregate data rate recommendation and/or limit from a parent communication device or an access device. Then, in step S402, a logical channel ID (e.g. LCID) is derived from the received aggregate data rate recommendation and/or limit. In step S403, associated logical channel IDs of downstream devices and/or associated remote communication devices are derived from a mapping table available at the relay communication device. Then, in step S404, a new data rate recommendation and/or limit with associated logical channel ID is created based at least partly on the received aggregate data rate recommendation and/or limit and the associated logical channel IDs of downstream devices and/or associated remote communication devices derived from the mapping table under optional consideration of own data rate requirements of the relay communication device.

Finally, in step S405, the created new data rate recommendation and/or limit is transmitted to one or more downstream communication devices.

Figure 5:
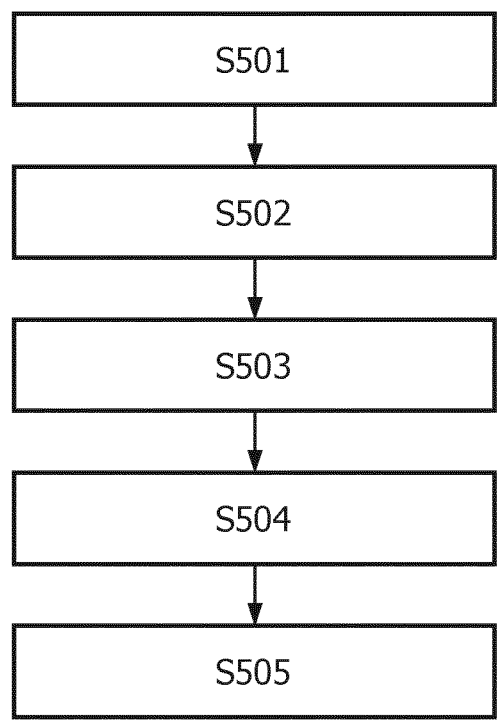
FIG. 5 schematically shows a flow diagram of an aggregate desired rate reporting procedure according to various embodiments.

FIG. 5 schematically shows a flow diagram of an aggregate desired rate reporting procedure according to various embodiments, which may be implemented at an access device (e.g. base station (gNB) 20 of FIG. 1 or eNB or access point) of a cellular or other wireless network.

In a first step S501, the access device receives from a downstream communication device an aggregate desired data rate for a logical channel. Then, in step S502, the logical channel ID (e.g. LCID) of the associated logical channel is determined. In step S503, a mapping table is consulted to derive from the determined logical channel ID associated directly and indirectly connected downstream communication devices. Then, in step S504, an aggregate data rate recommendation and/or limit is created based at least partly on the received aggregate desired data rate and the associated directly and indirectly connected downstream communication devices.

Finally, in step S505, the created aggregate data rate recommendation and/or limit is transmitted to the associated downstream communication device, i.e., back to the requesting device. This may be single-hop transmission over a logical channel e.g. as in a MAC CE, or a potential multi-hop transmission as in e.g. an IP packet, PDCP PDU, or RRC message.

Of course, the original query of the desired data rate might have triggered a change in the resource allocations so that also recommendations and/or limits may be sent to other downstream devices, not only the requesting communication device, and may also be sent to other logical channels, not only the logical channel for which the data rate recommendation and/or limit was requested.

It is noted that the steps of the flow diagrams of FIGS. 4 and 5 may be implemented based on one or more software routines used for controlling a processor or computing unit provided in the relay communication device or the access device, respectively.

According to various embodiments, transmission of the new and/or aggregate data rate recommendations or limits and/or aggregate desired data rates may be achieved by at least one of the following options:

1. The RRC protocol may be used, end-to-end relayed between relay communication device and access device in case of an L2 relaying architecture. RRC messages are in turn transported over PDCP over Radio Link Control (RLC) over MAC protocol over potentially multiple hops. This option has the benefit that reliability of transport is guaranteed (via PDCP, using retransmissions) and integrity protection may be applied. RRC may be extended with additional messages or fields to carry data rate recommendation values and/or limits. Furthermore, RRC PDUs may in turn carry PDUs of other higher-layer protocols, for example a NAS protocol container (e.g. N1 SM container), or IPv4/IPv6 packet, which may contain the transmitted data rate recommendations and/or limits, or desired data rates. Also, RRC over sidelink could be used, e.g. as defined in 3GPP specification TS 38.331, for example using an extended RRCReconfigurationSidelink message.

2. PDCP control or data PDUs may be used, e.g., by defining new PDCP messages to carry data rate recommendation values and/or limits. The PDCP PDUs may in turn carry PDUs of other higher-layer protocols, such as SDAP, IPv6 or IPv4, which may contain the transmitted data rate recommendations and/or limits or desired data rates. As an example, an SDAP header data may be used, e.g., by defining new SDAP header fields to carry data rate recommendations and/or limits.

3. MAC control elements (CE) may be used. This is a lightweight method, where in some cases it is even possible to opportunistically make use of unused space in a transport block, e.g., as achieved by "Padding BSR" MAC CEs. It may also use extended MAC CE elements, e.g. an extended Recommended Bit rate MAC CE, e.g. with extra fields to indicate whether the recommended bit rate relates to downstream/upstream direction (or that identifies if it is in uplink/downlink or sidelink direction), possible additional fields to indicate/identify the downstream UE for which the LCID value is meant and/or the identities (e.g. L2 identities) of the downstream UEs between which the logical channel identified by the LCID value is established, or will be established. A Recommended Bit rate MAC CE may also be extended to aggregate/combine multiple LCIDs and corresponding bit rate values into a single message. A Recommended Bit rate MAC CE may also be extended to include a single bit, or flag, to identify whether the control element is a recommendation or a query.

4. An extended uplink or downlink control information (UCI, DCI) data format may be used, which is sent directly between a relay communication device and an access device over UL or DL channels (e.g. via a physical uplink/downlink control channel (PUCCH, PDCCH) or a physical uplink/downlink shared channel (PUSCH, PDSCH)).

5. Within an extended sidelink control information (SCI) data format, which may be sent by a relay communication device to another relay communication device over an SL connection.

6. A combination of the above options by e.g. transmitting directly via RRC to or from an access device and also via MAC CE over a single radio hop to a direct upstream or downstream relay communication device.

Or, e.g. via MAC CE to a relay communication device which then collects one or more desired data rate reports from child relay communication device(s) and sends these using RRC as an aggregate desired data rate directly to the access device.

Figure 6:
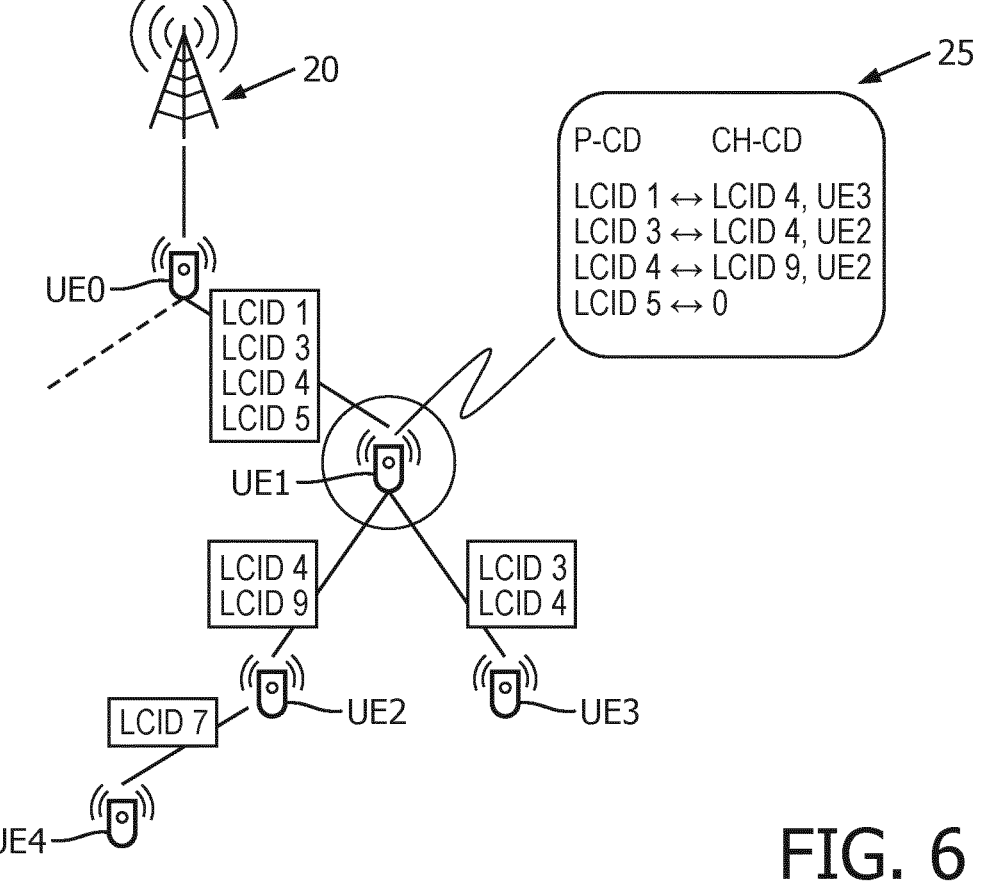
FIG. 6 schematically shows a network architecture with one-to-one channel mapping according to an embodiment.

FIG. 6 schematically shows a network architecture with one-to-one mapping between LCIDs in the first UE according to an embodiment.

In this embodiment a one-to-one mapping is implemented in the first UE (UE1) between respectively an LCIDi used between the first UE and its parent node (UE0) and an LCIDj used between the first UE (UE1) and a second UE (UE2, UE3), where the second UE may be a Relay UE (UE2), Remote UE (UE3), or both (UE2). In the example of FIG. 6, the second UE (UE2) comprises both functionalities, because it also gets its own LCID for its own data.

This implies that when the first UE (UE1) receives a data rate recommendation or limit from its parent node (UE0) indicating LCIDi, it can look up in an internal mapping table 25 the corresponding second UE (UE2 and/or UE3) and the LCIDj that identifies a logical channel for which to send a new data rate recommendation or limit to the second UE. Vice versa, when the first UE (UE1) receives a desired data rate request from a second UE (UE2 or UE3) indicating LCIDj, it can look up in the mapping table 25 the corresponding LCIDi to use when sending a new desired data rate request to its parent node (UE0), wherein the desired data rate value is at least partially based on the value received from second UE.

When the LCID values as defined in 3GPP Release 15 (e.g. Table 6.2.1-1 and 6.2.1-2 of 3GPP specification TS 38.321 v15.7.0) for downlink and uplink communication are used also for sidelink communication, the LCID can be in the range of "1" to "32". In that case, in this embodiment, the first UE (U1, Relay UE) can support at most 32 second UEs given that each second UE needs at least one associated LCID for a logical channel assigned on the communication link between first UE and its parent node (UE0) to be able to communicate over a logical channel. More LCID values for uplink and downlink are defined in 3GPP Release 16 (e.g. table 6.2.1-1/1a/1b and 6.2.1-2/2a/2b of 3GPP specification TS 38.321 v16.0.0) through an eLCID extension mechanism (a channel range 320 to $(2^{16}+191)$ is added). This enables a directly connected Relay UE (e.g. UE0) to support a very large number of child UEs (e.g. Relay UE1, or Remote UEs). Since Relay UEs, Remote UEs and access devices may support different versions of related standard specification(s), some of these devices may have different restrictions as to the number of LCIDs they may understand and support. For example, Release 16 UEs only supports LCID identifier values "4" to "19" for sidelink communication (cf. Table 6.2.4-1 of 3GPP specification TS 38.321 v16.0.0). If a Remote UE or Relay UE supports the extended number of LCIDs provided by the eLCID extension mechanism while a downstream remote UE or relay UE, or upstream relay UE supports only the Release 16 limited number of LCIDs, a mapping may be created in a relay UE that maps the limited number of LCIDs to a larger number of LCIDs, e.g., by assigning a different LCID for each downstream UE that supports only a limited number of LCIDs and report to the upstream access device or relay UE the new LCID instead. In this way, older Remote UEs or Relay UEs can be supported in a backwards compatible manner. To this end, the mapping may also include for each downstream UE the number of LCIDs it supports or may include the version of the standard specification it supports (e.g. 3GPP uses "capability reporting" for this so more like a flag saying "support-extended:true"). The assigning of a new LCID may take this into account and e.g. only reserve values "4" to "19" for assignment to older downstream UEs, and reserve an extended set of values for newer downstream UEs. Similarly, if the upstream UE or access device is only capable of handling LCID values "4" to "19", then the LCID for any upstream logical channel has to be chosen amongst those values.

When a second UE (being a Relay UE (UE2) or Remote UE (UE3) or both (UE2)) creates an additional upstream logical channel identified by LCIDj, this embodiment implies that the first UE will need to create an additional logical channel with an LCIDi on the wireless link with its parent node. The relayed data traffic coming from LCIDj of the second UE will then be transported over the logical channel LCIDi and vice versa incoming relayed data over LCIDi if forwarded will be sent over LCIDj to the second UE. Any bit rate recommendation or limit received for LCIDi will then trigger a creation of a new data rate recommendation and/or limit to be sent to the second UE indicating an LCIDj and indicating a recommendation or limit value that is typically equal to the received value.

Note that second UE(s) could optionally also implement the proposed enhanced recommendation or limitation procedure, acting like first UE and using a mapping table.

The base station (gNB) 20 can send data rate recommendations and/or limits downstream using e.g. the Recommended Bit Rate MAC CE to e.g. a directly connected UE (UE0). The directly connected UE receiving these data rate recommendation and/or limits can use e.g. an equivalent Sidelink Recommended Bit Rate MAC CE to send a new data rate recommendation to the first UE (UE1) and/or e.g. an equivalent Sidelink Bit Rate Limit MAC CE to send a new data rate limit to the first UE (UE1). The first UE (UE1) receiving these recommendations and/or limits can use Sidelink Recommended Bit Rate MAC CEs to send new data rate recommendations to downstream second UEs (UE2, UE3). Of course, other methods as indicated in later embodiments can also be used.

In an embodiment, the base station (gNB) 20 of a Relay UE may request the creation of a new radio bearer (e.g. data radio bearer, DRB) or new RLC channel to first UE (UE1) using an RRC reconfiguration message sent from the base station 20 to the UE, in response to determining that a downstream UE of first UE (e.g. a second UE (UE2,UE3)) requires a new logical channel and/or determining that a new Relay UE or Remote UE downstream of first UE (e.g. UE2, UE3 or UE4) is added to the network topology. Using RRC messages may require control plane connectivity between the base station 20 and first UE. The request may trigger the creation of a new logical channel, associated to the new radio bearer, in first UE.

In another embodiment, the first UE requests to the core network (CN) 100 the establishment of a new PDU session after creation of a new radio bearer on first UE, or upon determining that a downstream UE requires a new logical channel and/or determining that a new Relay UE or Remote UE downstream of first UE is added to the network topology. This may require control plane connectivity between the base station 20 and first UE. If the core network accepts the new PDU session, the first UE uses this PDU session to relay data traffic between this particular downstream UE and the core network.

In yet another embodiment, e.g. in case RRC cannot be used because there is no control plane connectivity, self-selection of an LCID for a sidelink communication channel by one of the involved UEs, e.g. by the first UE or by the UE requiring a new logical channel or by the parent Relay UE of the UE requiring a new logical channel, can be used or any other mechanisms being considered in 3GPP for LCID selection for ProSe-D2D/V2X-SL communication. One possible implementation can also be that only Relay UEs directly in radio range of the base station 20 implement the embodiment using RRC messaging, while other UEs not in radio range of the base station 20 implement other embodiments.

Thus, a radio bearer may be created on request of the base station 20, a communication device (UE) may request a new PDU session, or a communication device may select LCID (s) itself. These options can also be combined depending on what architectural choices are made (L2/L3) and further solution choices, and depending on whether the relay communication device (e.g. first UE) is directly or indirectly connected to the base station 20.

Optionally, the first UE may send a lower recommendation or limit value to a second UE, instead of "equal" as defined earlier. This is useful for example if the first UE has limited buffer space available and needs to reduce its current buffer sizes, but still wants to serve the second UE. Or, in case the first UE uses a part of the capacity on channel LCIDi for its own purposes, which of course may only be possible in case sharing of a single logical channel (and corresponding data radio bearer, DRB) will be allowed by 3GPP specifications.

The proposed one-to-one mapping between logical channels (LCIDi) of parent communication devices (P-CD) and logical channels (LCIDj) of child communication devices (CH-CD) in the mapping table 25 can be used for example for fine-grained recommended data rate control by an upstream node (e.g. base station (gNB) 20, or another parent Relay UE (UE0 in FIG. 6) of the first UE (UE1)). In the mapping table 25 of the first UE (UE1) in FIG. 6, the parent communication device (UE0) has created logical channels P-LCID1, P-LCID3, P-LCID4, and P-LCID5 to the first UE (UE1) and the first UE (UE1) as child communication device has created logical channels CH-LCID3, CH-LCID4, CH-LCID4' and CH-LCID9 to the second UEs (UE2, UE3). According to the current status of the mapping table 25, P-LCID1 is associated with CH-LCID4' and UE3, P-LCID3 is associated with CH-LCID4 and UE2, P-LCID4 is associated with CH-LCID9 and UE2, and P-LCID5 has no associated logical channel on the child UE side (e.g. because UE1 is using this CH-LCID5 for its own data communication in a role of Remote UE). It is noted that the two CH-LCID4s indicated in FIG. 6 are two distinct logical channels (a first CH-LCID4 between UE1 and UE2 and a second CH-LCID4' between UE1 and UE3). An LCID included within a MAC sub-header uniquely identifies a logical channel within the scope of the combination of Source Layer-2 ID and Destination Layer-2 ID.

When the upstream node (UE0) wants to recommend a data rate for a specific downstream Remote UE (UE3 or UE4 in FIG. 6), it can send a Sidelink Recommended Bit Rate MAC CE for the specific logical channel P-LCIDi (e.g. P-LCID1 in FIG. 6) which is associated to the Remote UE. The first UE (UE1 which is a Relay UE) will then use this same recommendation value in a new recommendation sent directly to the Remote UE (UE3), e.g. by using a Sidelink Recommended Bit Rate MAC CE, in case CH-LCIDj (e.g. CH-LCID4' in FIG. 6) of its mapping table 25 is associated to a directly connected Remote UE (UE3). Alternatively, if the Remote UE (UE4) is not directly connected to the first UE but indirectly, then CH-LCIDj (e.g. CH-LCID4 in FIG. 6) will point to the next downstream Relay (UE2) that the non-directly connected Remote UE (UE4) is using in its data relay path. Then, the first UE (UE1) will send the recommendation value, e.g. by using a new Sidelink Recommended Bit Rate MAC CE, directly to the next-hop Relay UE (UE2) in the path towards the Remote UE (UE4). The next-hop Relay UE (UE2) also applies the same algorithm as first UE (UE1), and so eventually the recommendation arrives at the targeted Remote UE (UE4).

The above usage example assumes that there exists a standard mechanism by which an upstream node (e.g. base station (gNB) 20 or parent Relay UE (UE0)) can learn the exact mapping between each LCIDi and the corresponding child UE. This can be achieved for example for a base station (gNB): each new Remote UE joining the network registers itself to the base station using RRC signaling. In response, the base station uses RRC signaling to create a new data radio bearer (DRB) between itself and the Remote UE, as well as any new logical channels (e.g. MAC logical channels and/or RLC channels) needed in all Relay UEs that are upstream of the new Remote UE, and the base station also performs via same RRC signaling the mapping table 25 configuration as needed in all these Relay UEs. In this case, the base station orchestrates the entire configuration so that it learns the exact mapping this way. It may also be achieved for example as follows in case there is no control plane connectivity between the base station and Remote UEs: each new Remote UE joining the network registers itself to its parent Relay UE using a form of D2D communication which may include one-hop RRC signaling, link-local IP communication, ProSe discovery messages, or other. The parent Relay UE allocates new logical channel(s) to the new downstream child Remote UE. The parent Relay UE, if not directly connected to the base station, uses the same or similar D2D communication to report the logical channel allocations to its next upstream parent Relay UE. This next parent in turn may create a new logical channel towards the reporting Relay UE. This next parent may in turn report the new logical channel allocations to its next upstream parent Relay, and so on. The final Relay UE that is in direct connection with the base station may report the aggregate collected information about logical channel identities and configurations to the base station using e.g. RRC signaling. Also it may initiate the process to create a new PDU session via core network functions. Then, the core network may send the decision on creating a new PDU session to the base station (gNB) 20, via which it will also be sent to the requesting Relay UE. The base station can allocate a specific data radio bearer with own LCID(s) for the Relay UE for the new PDU session (one bearer may associate to one or more LCIDs, depending on bearer properties). This way the core network can be aware of the Remote UEs that are active for a given Relay UE, and the base station (gNB) 20 can also be aware of these Relay UEs and knows the associated LCIDi for each.

Optionally, the first UE (UE1) may aggregate multiple desired bit rate messages from downstream UEs, that are received for example using Recommended Bit Rate MAC CE from child UEs or other means. The first UE reports these values upstream by mapping the CH-LCIDj for which it has received a message to a corresponding upstream P-LCIDi for which a new report message with aggregate desired bit rate is to be transmitted e.g. at a future point in time. Specific trigger conditions and/or timers can govern the time of upstream transmission(s). Multiple reports with desired bit rate messages about multiple P-LCIDi may be aggregated into a single upstream message.

If the first UE (UE1) finds no match in the mapping table 25 towards a downstream second UE (UE2 or UE3) this could be handled as follows:

If the P-LCIDi is used for the first UE's own communications, then it may use the aggregate bit rate recommendation itself.

Otherwise, if the P-LCIDi is associated to a Remote/Relay UE that has left already, has disconnected e.g. due to a handover procedure, or is unresponsive, the first UE (UE1) could ignore recommendation messages for this P-LCIDi for a certain amount of time. At some point the base station (gNB) 20 may notice the new situation and may request for removal of P-LCIDi since the channel is no longer needed. Or, the first UE (UE1) could return back an error message report for P-LCIDi to the upstream UE (UE0) or base station (gNB) 20 immediately or at a future point in time (e.g. included in a future/next MAC PDU that is sent). Or, the first UE itself may initiate itself a procedure to remove or deactivate the logical channel indicated by the LCIDi and/or a data radio bearer associated to it. Or, the first UE itself may initiate a procedure to stop the PDU session related to P-LCIDi, if any, since this is no longer required now that the Remote UE has disconnected. Optionally, the first UE may send a new data rate recommendation to one or more of its remaining downstream Remote/Relay UEs triggered by the determination that one of its downstream UEs has left, has disconnected (e.g. at its own initiative), was handed over to another parent device (e.g. another Relay UE or gNB) via a handover procedure (e.g. initiated by a gNB or by the downstream UE itself) or has become unresponsive. This allows the first UE to for example quickly redistribute a prior recommendation received from an upstream device in a more optimal way to its remaining connected downstream devices (UEs), given the new network topology situation, without having to wait until the upstream device sends a next data rate recommendation.

Otherwise, if the P-LCIDi is completely unknown or unexpected, the first UE (UE1) may ignore the message. This is an error situation that is not expected to occur frequently.

A second UE (UE2, UE3) may apply 3GPP power saving methods while staying connected to the first UE (UE1) as its parent Relay. It may thus happen that a second UE to which a recommendation/limit needs to be delivered is unavailable at the time that the first UE would like to send the recommended/limit bit rate.

If the second UE is unavailable because of DRX or eDRX or PSM then the first UE should cache the recommendation/limit and wait until the next occasion where either (1) data is to be sent to the second UE i.e. a MAC PDU, or (2) the second UE wakes up again and starts sending new data i.e. a MAC PDU to the first UE, and may then send the recommendation/limit. In case 1, it may be included for example as a MAC CE inside the MAC PDU sent. In case 2, it may be included for example as a MAC CE in a MAC PDU sent to the second UE following the event of the MAC PDU sent by the second UE to the first UE after the wake-up, or possibly as part of an ACK message sent by the first UE to the second UE to confirm reception of the data or MAC PDU.

If the second UE is still unavailable while a new recommendation is received by the first UE from an upstream node, then the old cached recommendation can be discarded.

If the second UE is unavailable for a long time, it may have left and the corresponding options described above for the case of a non-available downstream second UE can be applied.

Figure 7:
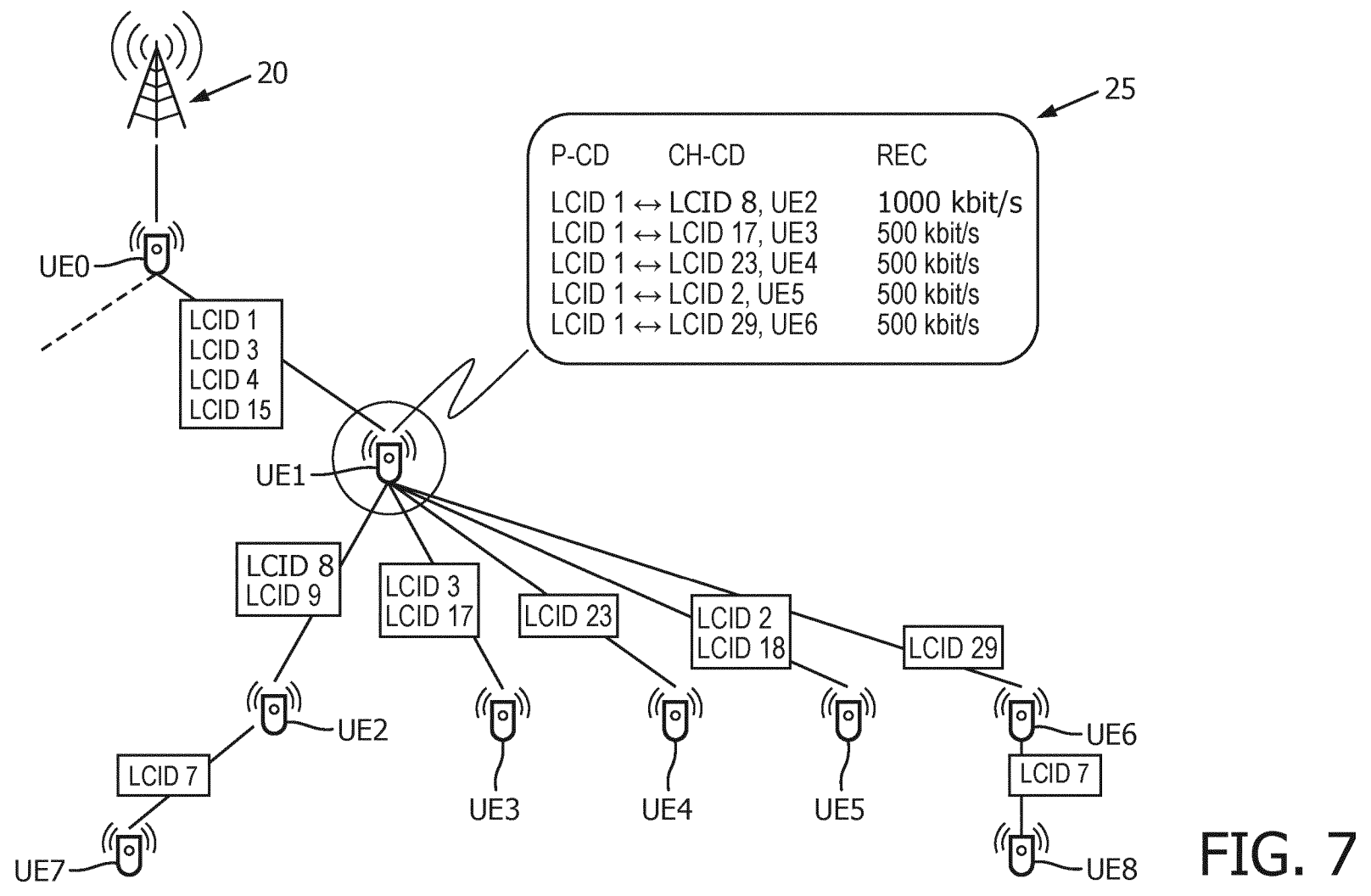

FIG. 7 schematically shows a network architecture with one-to-many mapping between logical channels (LCIDs) in the first UE (UE1) according to various embodiments.

For this embodiment, the previous embodiment of FIG. 6 can be taken as a starting point. The difference is now that a one-to-many mapping is implemented in the first UE (UE1) between respectively a P-LCIDi (e.g. P-LCID1, P-LCID3, P-LCID4 and P-LCID15 in FIG. 7) used between the first UE and its parent node (UE0) and a CH-LCIDj (e.g. CH-LCID2, CH-LCID3, CH-LCID8, CH-LCID9, CH-LCID17, CH-LCID18, CH-LCID23 and CH-LCID29 in FIG. 7) used between the first UE (UE1) and a second UE (UE2 to UE6).

This implies that when the first UE (UE1) receives a data rate recommendation from its parent node (UE0) indicating P-LCIDi, it can look up in its internal mapping table 25 potentially multiple corresponding second UEs and potentially multiple corresponding CH-LCIDj that identify a logical channel for which to send a new data rate recommendation.

In the example of FIG. 7, a single aggregate data rate recommendation received from upstream P-LCID1 can map to five downstream second UEs (UE2, UE3, UE4, UE5 and UE6) with respective CH-LCID8, CH-LCID17, CH-LCID23, CH-LCID2 and CH-LCID29. Then a single data rate recommendation for P-LCID1 of 3000 kbit/s may map to five downstream data rate recommendations ("REC" in mapping table 25) of respectively 1000 kbit/s for CH-LCID8 to UE2, 500 kbit/s for CH-LCID17 to UE3, 500 kbit/s for CH-LCID23 to UE4, 500 kbit/s for CH-LCID2 to UE5 and 500 kbit/s for CH-LCID29 to UE6.

In an example, the first of these downstream UEs (UE2) may be given priority based on some quality of service (QoS) related policy executed by the first UE, as explained later. Any quality indicator of a logical channel (upstream, downstream, relay-related, non-relay-related, etc.) or multiple quality indicators coming from multiple logical channels could be used by the first UE (UE1) for the policy execution.

An alternative policy could allocate more bit rate to UE2 and UE6 because these are relays with further downstream UEs (UE7, UE8), so they could potentially have higher need for bandwidth.

In another example, a single aggregate data rate recommendation received on, or indicating, logical upstream channel P-LCID1 could map to two second UEs, first one with three logical downstream channels CH-LCID8, CH-LCID9 and CH-LCID10 and a second one with one logical downstream channel CH-LCID16.

Vice versa, when the first UE (UE1) receives a desired data rate request from a second UE indicating CH-LCIDj, it can look up in the mapping table 15 the corresponding P-LCIDi to use when sending a new desired data rate request to its parent node (UE0), wherein the desired data rate value is at least partially based on the value received from second UE.

When a new second UE (either Relay (such as UE2 and UE6) or Remote (such as UE3 to UE5) or both) connects to the first UE (UE1), this embodiment does not require that the first UE will request an additional logical channel with a new P-LCIDi on the wireless link with its parent node (UE0). The relayed data traffic of the new second UE can be transported in principle over an existing logical channel (e.g. P-LCID1) between the first UE (UE1) and its parent node (UE0).

Optionally, the first UE (UE1) may transmit downstream recommendation/limit values to second UEs, the sum of these being lower than the received aggregate recommendation/limit value from an upstream device. This is useful for example if the first UE (UE1) has limited buffer space available and needs to reduce its buffer sizes, or if it needs to use some capacity of the same upstream P-LCIDi itself. As an alternative option, a table may be used that maps a bitrate ID value to an actual bit rate. Then, the sum of recommendations sent downstream must not exceed the received aggregate recommendation value.

Optionally, the first UE (UE1) may not further send a downstream recommendation/limit to a second UE if that recommendation does not substantially deviate from an earlier recommendation/limit sent to that same UE.

In an embodiment, the first UE (UE1) may perform fair sharing of bitrate between multiple downstream UEs. As an example, all Relay/Remote UEs (UE2 to UE8) may use the Sidelink Recommended Bit Rate MAC CE or another MAC CE in their communication with upstream and downstream nodes.

Then, the first UE (UE1) may be configured to carry relay-related data traffic upstream over one or more separate logical channels, while data of the first UE (UE1) itself to/from the base station (gNB) 20 (not related to relaying operations performed by first UE) may be transferred using different logical channel(s).

If the first UE (UE1) receives from its upstream node (UE0) a Sidelink Recommended Bit Rate MAC CE and the included P-LCIDi is a relay-related logical channel, then it first identifies the set of all involved downstream UEs that have their data flowing through this logical channel.

It is assumed that the first UE (UE1) has received a recommendation data rate value Vrec for this logical channel P-LCIDi. Then, it maps for every set member the LCID to a downstream CH-LCIDj (which could be same or different value) and sends to every member a Recommended Bit Rate MAC CE that includes a new recommendation value Vrec_i≤Vrec, wherein the sum over i of all Vrec_i does not exceed the value Vrec.

Thereby, the available data rate recommendation can be distributed over the set of potentially multiple downstream UEs.

The above distribution can be made fair by using a previously received desired data rate (e.g. using a recommended data rate query mechanism as described above) of each set member (i.e. downstream UE) to guide the distribution of the recommended data rate. I.e., a UE in the set that desires twice as much data rate as another UE in the set will receive approximately twice as much recommended data rate as the other UE.

Figure 8:
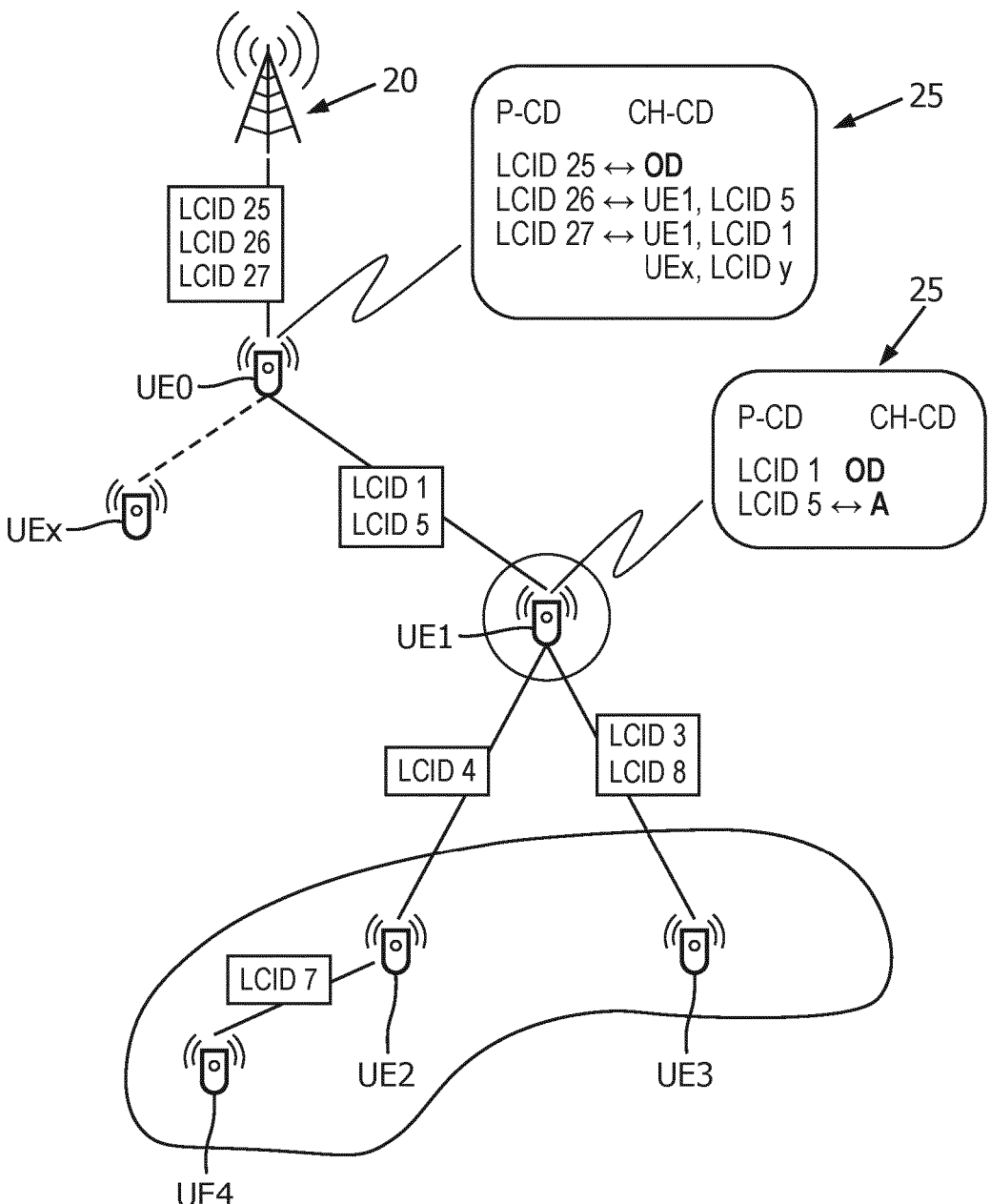
FIG. 8 schematically shows an example of a network architecture with one-to many channel mapping where a single logical channel indicates relayed data of a group of communication devices.

FIG. 8 schematically shows an example of network architecture with one-to-many channel mapping where a single logical channel indicates relayed data of a group of communication devices.

In an embodiment of FIG. 8, the first UE (UE1) sends an aggregate desired data rate request to the base station (gNB) 20 which may respond with an aggregate recommended data rate, wherein a policy is used to distribute data rate recommendations to downstream UEs. This embodiment covers first collecting a number of desired data rates received from downstream UEs and then sending the combined number (aggregate desired data rate) to the base station (gNB) 20 and then receiving a recommended data rate total value (aggregate data rate recommendation) from the base station (gNB) 20, which is then distributed to downstream UEs using a policy.

In the specific example of FIG. 8, a single logical channel P-LCID5 used by the first UE (UE1) indicates all relayed data of a group of UEs consisting of all downstream UEs of the first UE (UE1). To achieve this, a mapping table 25 of the first UE (UE1) maps logical parent channel P-LCID5 to a group of all downstream UEs (UE2 to UE4) indicated by "A" in the mapping table. Additionally, a logical parent channel P-LCID1 is used for own data (OD) of the first UE (UE1).

Furthermore, a mapping table 25 of the parent Relay UE (UE0) maps logical parent channels P-LCID25, P-LCID26 and P-LCID27 to own data (OD) usage of the parent Relay UE (UE0), the logical channel CH-LCID5 of child device UE1, and the logical channel CH-LCID1 of child device UE1, respectively, wherein the logical parent channel P-LCID25 is used for own data (OD) of the parent relay UE (UE0).

The first UE (UE1) sends one aggregate desired bit rate value upstream (indicating e.g. a logical channel P-LCID5), which is approximately the sum of desired bit rates received from multiple child UEs (Relays and/or Remotes) that are allocated to the same upstream logical channel P-LCID5 of the first UE (UE1).

The parent relay UE (UE0) receives the aggregate desired bit rate value from the first UE (UE1) and sends the same value upstream to the base station (gNB) 20 as aggregate desired bit rate for a logical channel P-LCID26.

The base station (gNB) 20 receives the one aggregate desired total bit rate message indicating P-LCID26 and due to the LCID information contained in the message it can determine for which group of UEs (UE2 to UE4 encircled as a group in FIG. 8) the aggregate desired bit rate holds, regardless of whether the determined UEs (UE2 to UE4) are directly or indirectly connected to first UE (UE1).

Figure 9:
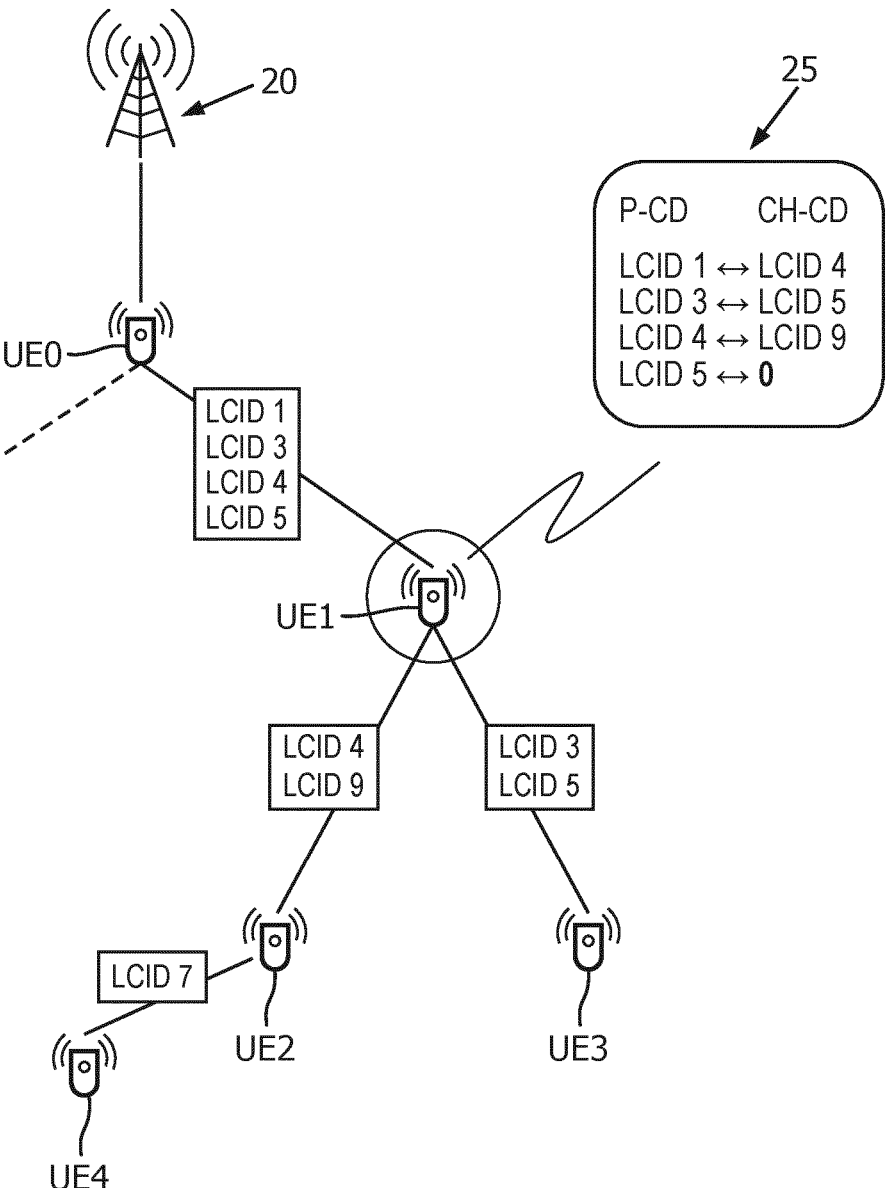
FIG. 9 schematically shows an example of a network architecture with one-to-one channel mapping with unique downstream logical channel identities.

FIG. 9 schematically shows an example of network architecture with unique downstream LCIDs, i.e., one data rate recommendation/limit is used per Remote UE.

It is noted that a mapping table 25 used by the first UE (UE1) of FIG. 9 does not indicate a UE in this example. Here, the downstream LCIDs are unique values and the mapping table 25 therefore does not need to indicate a child UE by its identity anymore. The identity of a child UE directly follows from the LCID as downstream LCIDs are unique.

The mapping table 25 maps logical parent channels P-LCID1, P-LCID3, P-LCID4 and P-LCID5 to unique logical child channels CH-LCID4 of child device UE2, CH-LCID5 of child device UE3, and CH-LCID9 of child device UE2, respectively, wherein the logical parent channel P-LCID5 is not mapped to any downstream logical channel yet.

Therefore, base station (gNB) 20 can send individual data rate recommendations and/or limits to a selected Remote UE (e.g. UE3) just by picking the right channel (e.g. P-LCID3), assuming that all traffic on that channel is related to that particular Remote UE.

It is noted that the case of FIG. 9 is a specific subcase of the one-to-one mapping case of FIG. 6. There, each Relay UE has SL links setup with its child UEs so it knows the L2 identity (ID) per child, per the V2X sidelink solution described in 3GPP specification TS 23.287 v16.2.0, therefore it can use L2 child UE identities in the mapping table 25.

In an embodiment, it is assumed that the base station (gNB) 20 knows the entire relay network topology (e.g. based on previous channel creation, configuration and/or commissioning procedures and/or reporting procedures of communication devices or the like) and that in relation to the topology the base station (gNB) 20 knows the purpose of the different logical channels and/or radio bearers created and/or used by UEs (e.g. relaying data traffic purpose) and their associated LCIDs. So, in the example of FIG. 8, the base station (gNB) 20 knows that by sending an aggregate recommendation value to UE0 for the logical channel P-LCID26 this value will get distributed as a new recommendation to the first UE (UE1) indicating logical channel CH-LCID5.

Moreover, the base station (gNB) 20 also knows that first UE (UE1) will distribute this value over its downstream second UEs (UE2 and UE3) using a selected policy, where the relay-type UE (UE2) of the second UEs may also share the received aggregate data rate recommendation from the first UE (UE1) over itself (UE2) and its child UE (UE4).

The exact sharing method (policy) used by the first UE (UE1) may also be known by the base station (gNB) 20 in case that the policy of data rate distribution is governed by the base station (gNB) 20 (e.g. through RRC configuration messages). If the policy is fixed (another option), then the base station (gNB) will know the fixed policy being used. In general, a policy may be depending on design details and/or also be defined by a set of configuration parameters and/or rules (e.g. rules defining which actions to be taken under given conditions). These set of configuration parameters, policies and/or rules may be provided by one or more different network entities such as gNB, PCF (via AMF), SMF and/or provided by one or more local entities in the first UE such as Universal Integrated Circuit Card (UICC) or an application program. In some of these cases, the gNB may know the effective policy or parts thereof, e.g. when the first UE communicates policy elements to gNB or other network entities (e.g. PCF or SMF) communicate policy elements to the gNB. In other cases, the gNB may not know the effective policy, e.g. if the active policy elements are not communicated to gNB and not determined by gNB either.

In case of a one-to-one mapping between LCIDs of logical channels at the parent Relay UE (UE0), the base station (gNB) 20 knows that a recommendation value sent to the parent Relay UE (UE0) for logical channel P-LCID26 will be sent as a new recommendation with equal recommendation value to logical channel CH-LCID5 of the parent Relay UE (UE0) which equals the logical channel P-LCID5 of the first UE (UE1).

Based on scheduler information, the base station (gNB) 20 determines a total recommended data rate value (aggregate data rate recommendation) for the group of UE(s) (UE2 to UE4).

The total recommended data rate value of the aggregate data rate recommendation is sent back to the parent Relay UE (UE0) as a Recommended Bit Rate MAC CE element indicating the same logical channel P-LCID26 as was indicated in the aggregate desired bit rate message.

The parent Relay UE (UE0) sends a new Sidelink Recommended Bit Rate MAC CE indicating logical channel CH-LCID5 to the first UE (UE1). The first UE (UE1) applies a policy to distribute the recommended bit rate among the UEs (UE2 to UE4) that are in the group of UEs as indicated by above logical channel LCID5. This may include downstream UE(s) and the first UE (UE1) itself. The first UE (UE1) may send new recommendations only to UE2 and UE3 (i.e. its children). Then, UE2 may send another new recommendation further to its child UE4. The policy may be applied with a goal to distribute recommendations to the whole group.

The policy could be the fair-sharing policy described above or any other one. It may be configurable by the base station (gNB) 20 or by a function in the core network. In the above example, the logical channel CH-LCID5 indicates all its child UEs ("A" in the mapping table 25 of the first UE (UE1)). Thus, the first UE (UE1) sends to each of the child UEs a recommended data rate message (Sidelink Recommended Bit Rate MAC CE or another MAC type of CE) including a value that is approximately a specific fraction/ portion of the total recommended data rate value of the aggregate data rate recommendation according to the selected policy. After child UE2 receives the recommended data rate message from first UE, it may apply a policy to assign a specific fraction/portion of the total recommended data rate it received to its child UE4 and assign the remainder to itself. It may then send a recommended data rate message (e.g. Sidelink Recommended Bit Rate MAC CE or other MAC CE) containing the assigned data rate to its child UE4.

As already mentioned above, an example of a policy could be to provide more data rate to a Relay UE than to a Remote UE, since a Relay UE may need to further distribute the data rate budget to downstream UEs while a Remote-only UE does not.

The embodiments described herein can be implemented with another MAC CE element, or a modified one, that defines a data rate limit instead of a recommendation. I.e., the Recommended Bit Rate MAC CE format could be re-used as such but could also be defined as a different type of MAC CE such as Sidelink Bit Rate Limit MAC CE or other type. The data rate limit carried by the MAC CE element may be expressed as an Aggregated Maximum Bit Rate (AMBR), e.g. per logical channel or set of logical channels, as a Guaranteed Flow Bit Rate (GFBR), a Maximum Flow Bit Rate (MFBR), or other type. It may also be expressed by an index value or identifier value from which a Relay UE or Remote UE can derive or look up the corresponding data rate limit(s), for example a 5G QoS Identifier (5QI), PC5 QoS Identifier (PQI), QoS Flow Identifier (QFI), or index value into a preconfigured table of limits. It may also be expressed as a combination of such identifier value and another type of limit value, for example a PQI value together with a relative percentage value that indicates what percentage of the total bit rate limit associated to the given PQI is to be used as the data rate limit.

Furthermore, the embodiments described herein can be implemented with data rate recommendations and data rate limits together. So, both types of information may be carried in separate MAC CE elements or a combined new MAC CE element.

Additionally, in an embodiment, the recommendation and/or limit may be defined as a relative value, e.g., relative to a maximum data rate that a child UE can support e.g. over a sidelink connection towards a parent Relay UE. For example, it may be calculated similar to the DL and UL maximum data rate supported by the UE (e.g. as defined in section 4.1.2 of 3GPP specification TS 38.306 v16.0.0). The access device or parent Relay UE may transmit the recommendation and/or limit to a downstream UE encoded e.g. as an indicator of a fraction or percentage of the supported maximum sidelink data rate of that downstream UE. In this case, the parent Relay UE may know the parameters required for doing the maximum sidelink data rate calculation due to its communication link with the downstream UE. The downstream UE may also calculate its own maximum sidelink data rate based on these parameters, so that it can derive the absolute recommendation and/or limit values from the received relative (e.g. fraction/percentage) indicator values.

In any embodiment described herein, a configurable policy may be implemented in the Relay UE (e.g. the first UE) and extra bits may optionally be added in a MAC CE element or other conveying message to be able to select a policy (out of a finite number of policies) to apply in the Relay UE. In an example, the Recommended Bit Rate MAC CE has a couple of 'reserved' unused bits which could be used for this purpose. As another option, bits may be repurposed to select a policy in the downstream Relay UE to apply, wherein the selected policy influences the distribution of recommended bit rate to its further-downstream UEs. As a further option, policies may be predefined per specification of a selected standard (e.g. 3GPP), preconfigured (e.g. in the UICC), or dynamically configured e.g. at the moment that a UE becomes a Relay UE or during operation of a Relay UE. For example, policies may be configured using 5G signaled QoS rules sent to the UE over the NAS protocol. A policy or set of policies may also be sent as configuration elements using the RRC protocol, or as part of a System Information Block (SIB), or as a set of configuration parameters and/or rules that may be provided by one or more network entities such as PCF (via AMF), gNB or SMF.

In a modification of the embodiment, a set of policies to choose from may also be selected based on a QoS indicator that is known by the Relay UE to be related to the specific LCID indicated in the MAC CE element.

Example policies could be "distribute up to 90% of recommended bit rate fairly between all high-priority logical channels and distribute the remaining 10% fairly between low-priority logical channels" or "use up to 40% of recommended bit rate for yourself and distribute the remaining 60% fairly between downstream UEs".

In another embodiment, a configurable policy may be used in the Relay UE (e.g. first UE), wherein the policy selection for the distribution policy when receiving a bit rate recommendation from an upstream communication device can be based on the value of a quality indicator (e.g. 5G QoS indicator, such as the 5QI value). A quality indicator (e.g. 5QI or PQI) may be known in the Relay UE for each logical channel identity (LCID) it uses. One specific example of a quality indicator is the PC5 Quality Indicator (PQI) associated to each PC5 Sidelink connection between a Relay UE and multiple of its Remote UEs. Such values can be jointly used and compared by the Relay UE, to select a policy in which the Remote UE with the highest-priority PQI value is assigned a relatively greater share of the total data rate recommendation, in cases where the total recommendation (as received by the Relay UE from an upstream parent device) is insufficient to accommodate all the data rate requirements of downstream Remote UEs. Another specific example of a quality indicator is a NAS-signalled message from SMF to the Relay UE that is sent to inform the UE of changes in QoS parameters (e.g. 5QI, GFBR, MFBR) as defined in 3GPP TS 23.501 Version 17.0.0 Section 5.7.2.4.1b, which may be sent in this way when Notification Control is enabled for a QoS flow used by the Relay UE. In the Relay UE, reception of a new quality indicator value may trigger the selection of a different policy such that the active policy is always best matched to the current QoS conditions for the link upstream of the Relay UE. As an example situation and policy, a reduction of GFBR value may trigger the Relay UE to select a new policy in which a lower relative fraction of received data rate recommendation (s) from upstream device(s) is being propagated to its downstream Relay/Remote UE(s), in order to better guarantee that its own upstream data traffic can be sent as usual i.e. without data rate reduction, at the expense of providing lesser service to its downstream Relay/Remote UE(s). The above Notification Control mechanism using NAS-signalled messages from SMF to the Relay UE may also be used in case there are Alternative QoS Profile(s) (per 23.501 Section 5.7.1.2a) used for the Relay UE. In this case when RAN determines that current QoS cannot be guaranteed anymore, it can inform this to SMF (which will in turn inform the UE) and at the same time RAN selects an Alternative QoS Profile with alternative QoS parameters defined, to realize a new QoS level for the UE that can be met by RAN. The selected Alternative QoS Profile will also be signaled to the UE via SMF. The quality parameters contained in this signaling message can, in exactly the same way as described above, trigger the selection of a new policy. If at some point in time the RAN can again offer the original/most-preferred QoS level, or a better Alternative QoS level, to the Relay UE then using the same signaling mechanism the Relay UE will be notified of this fact, again enabling the Relay UE to select a corresponding (different) policy. Alternatively, a set of alternative QoS profiles may be provisioned by the gNB, the PCF/SMF or other core network function, to the Relay UE that the Relay UE can use for selecting another QoS profile if the desired QoS is not achievable anymore due to changing conditions, and use the chosen alternative QoS profile to change the data rate recommendations for its downstream devices accordingly.

In a further embodiment, a Relay UE (e.g. first UE) may be provisioned with a table indicating upstream-to-downstream QoS mapping. Specifically, this may be a table with one or more entries where an entry maps an upstream 5QI quality indicator to a corresponding PQI quality indicator for downstream logical channels, and vice versa. The Relay UE then may use this table to determine a desired or attainable end-to-end QoS, or characteristics thereof, for a particular downstream UE. This information may in turn be used to determine the distribution policy and/or as part of a distribution policy compute specific values for downstream recommendation(s) based on the determined end-to-end QoS characteristics.

In yet another embodiment, a policy is selected by the Relay UE based on a number of downstream communication devices of a Relay UE, which can be for example a downstream Relay UE that is served by the Relay UE. In this case the Relay UE may determine that this particular downstream Relay UE is serving a relatively large number (Nr) of the total number of downstream communication devices (Ntot), for example (Nr/Ntot)>0.5. The Relay UE may then decide to allocate a particular larger fraction (e.g. (Nr/Ntot)) of its received data rate recommendation(s) and/or limit(s) budget to that one downstream Relay UE. As in this example, the details of the selected policy may be generated locally by the Relay UE based on locally available information such as measured parameters, received system information and/or parameters, or policy templates that are locally stored. In general, the selected policy may also be selected from multiple policy candidates that are predetermined e.g. by a specification or implementation, generated locally as explained above, and/or preconfigured e.g. by a network function or UICC-stored information, and/or dynamically configured during operation e.g. by RRC communication from gNB. In a yet further embodiment, a policy is selected by the Relay UE based on a type of downstream communication device. This may be a downstream device that is directly connected to the Relay UE via a communication link (i.e. a child device), or it may be a downstream device that is further downstream so not directly connected to the Relay UE. An example of a device type that may typically impact the selected policy is the distinction between a Relay UE device type or Remote UE device type. (The latter is then not acting as Relay UE simultaneously while acting as Remote UE.) One advantageous policy for the Relay UE is then to allocate a relatively larger fraction of its received data rate recommendation(s) and/or limit(s) to those child downstream devices that are of the type Relay UE. Since these devices are likely to be serving yet other downstream Relay UEs or Remote UEs, and Remote UE type devices are not doing so. So the Relay UE type devices are more likely to require a relatively higher allocation of the total available data rate in order to serve their downstream devices better. A further refinement of this approach would be to classify between "Relay UEs serving other Relay UEs", "Relay UE serving only Remote UEs", "Relay UE serving no Remote UEs currently", and "Remote UE". The device types mentioned earlier in this list would then typically be allocated a relatively higher proportion of the available data rate recommendation budget than the device types mentioned later in the list. Other device type classifications can also be made, for example defining the devices types based on radio access technology such as NR-based radio device, LTE-based radio device, NR RedCap (Reduced Capability) radio device, NB-IoT/LTE-M device, Wi-Fi radio device, etcetera. Or distinguishing devices types as 'video streaming device', 'audio streaming device', 'non-streaming device', etcetera, based on the current device activity. Also multiple of these device type classifications may be combined when implementing a policy selection based on device type. Alternatively or additionally, the relay UE may receive information from the Remote UE or the gNB or a core network function or an upstream or downstream UE the type of data (e.g. lossless streaming data, lossy streaming data, voice call related data, video call related data, AR/VR related data, bulk data, delay-sensitive data, delay-insensitive data, I/O data, etc) that is expected to be transported and use this to select a policy and/or to determine a data rate recommendation for one or more downstream devices and/or to determine a data rate recommendation query for one or more upstream devices.

In a yet further embodiment, a policy is selected by the Relay UE based on a network slice identifier. This slice identifier could identify a 5G network slice which the Relay UE is currently connected to for all its upstream communications. Or, it could identify a (5G) network slice which a downstream communication device (UE) is currently connected to. As an example of a typical advantageous use of this way of selection, a Relay UE may determine (on its own or with assistance of the RAN) that one of its child Relay UEs is operating in a special network slice that is reserved for high-priority public services while other downstream UEs are operating in network slices with default priority. Based on this (high) priority, a relatively higher fraction of the data rate recommendation and/or limit could be allocated to the Relay UE serving the high-priority network slice. Possibly, even the lower-priority downstream UEs could be sent zero as the data rate recommendation and/or limit to leave as much capacity as possible to the high-priority network slice devices. As another example, the network slice identifier of the Relay UE's current network slice it is connected to may be used for selecting a policy; in case the Relay UE may be joined to different slices at different times (e.g. one slice out of two total slices it may connect to), based on particular circumstances (e.g. one slice may be only offered in a particular geographic region or when particular base stations are reachable). Each slice, constituting a different network with different priorities/QoS requirements/purposes, may want to impose its particular rules on how a relay assigns the data rate recommendations and/or limits to its downstream devices. Using the slice identifier of the current network slice that is connected allows the Relay UE to select the right policy or set of policies to meet the operational and performance goals of the slice, for example depending on particular network slice serving the Remote UEs may be considered as more or less important, requiring a policy tailored to that need.

In yet another embodiment which may be combined with any other embodiment or implemented independently, a relay UE may support reflective QoS (as defined in TS 23.501). The relay UE may send its capability to support reflective QoS during initial registration or during the PDU session setup (e.g. during setup of a PDU session that will be used for relay communication for one or more downstream UEs) or by sending a NAS message to the AMF/SMF or other core network function. If reflective QoS is triggered to be used (e.g. by the SMF) for one or more QoS flows, the NG-RAN and UPF are informed to include a QoS flow identifier (QFI) in each downstream message over the respective QoS flow (within the established PDU session) to the relay UE. In this embodiment, the relay UE may use the received QFI in a message received via NG-RAN not only to determine a corresponding PC5 QoS flow, but also advantageously to select a data recommendation policy to apply and/or to change the data recommendation for one or more downstream UEs and/or send a new data rate recommendation message to one or more downstream UEs. As per the current 3GPP specifications, the reflective QoS configuration for NG-RAN and the UPF and the QFI in each downstream message for the Relay UE are only applied when reflective QoS is used. It would however be beneficial to always include the QFI in each downstream message from NG-RAN to the relay UE. Unfortunately, this may lead to confusion when to apply reflective QoS to update the QoS flow configuration and filters in the relay UE (which may be preconfigured by the SMF) for upstream messages and also lead to confusion in the NG-RAN and/or SMF/UPF and/or other core network functions as to whether or not reflective QoS or preconfigured QoS configuration will be used by the Relay UE. Therefore, in order to distinguish between reflective QoS and non-reflective QoS being applied by the Relay UE, in this embodiment the SMF may send a message (e.g. via NAS) to the UE that it reflective QoS needs to be applied or not, e.g. per QoS flow and/or the SMF may omit sending a Reflective QoS timer value/configuration to the UE even in cases that the UE has indicated support for reflective QoS. If the reflective QoS timer information was not received by the UE, then upon receiving a message via NG-RAN that includes a QFI value will not derive any new QoS flow configuration or filters and/or will not update any (pre-) configured QoS flow configuration, filter or QoS mapping and/or will not apply any default timer and/or will not reset a timer As indicated above, various other ways to encode the data rate recommendation and/or limitation information can be used.

Examples are a MAC CE element that combines a recommended value plus a limit (e.g. maximum) value, or a MAC CE element that includes an integer number denoting a bit rate value (e.g. kbit/sec) instead of an integer category or class number. Furthermore, as explained earlier, various ways of sending the data rate information to the Relay UE (e.g. first UE) or Remote UE can be used. Examples are MAC CE, PDCP protocol (can be end-to-end from base station (gNB) to Relay UE or single hop e.g. from a Relay UE to a Remote UE, or single hop e.g. from a Relay UE to a Relay UE), RRC protocol (e.g. inside a newly defined configuration element, can be end-to-end from base station (gNB) to Relay UE or single hop (e.g. from a Relay UE to a Remote UE or from a Relay UE to a Relay UE)).

For non-Relay UEs, conventional procedures (such as a Recommended Bit Rate MAC CE query procedure) can be used to decide when to send an (aggregate) desired data rate request. It can also be implementation-dependent when to send.

Examples for Relay UEs (e.g. first UE) when to send an upstream message with desired data rate request information can be:

1. Send an upstream message with data rate information as soon as at least N (configurable N) data rate messages have been received from downstream UEs.
2. Based on timer expiry, wherein a timer can be started (if not already running) in response to a message received from a downstream UE.
3. When the combination of messages received from downstream UEs lead to a significant change in a desired uplink/downlink data rate, compared to earlier (e.g. last) reported value(s).
4. Based on rules that combine one or more of the above options with available space in downstream data packets.

Examples for Relay UEs (e.g. first UE) when to send a recommendation received from an upstream node (UE or base station (gNB)) to one or more downstream nodes can be:

1. Right after receiving the recommendation from an upstream node;
2. based on a timer expiry; or
3. based on rules that combine one or more of above options with available space in downstream data packets.

There may be specific formats defined for combined reporting of multiple data rate queries, or combined reporting of data rate recommendations, or limits, or limits and recommendations together, for multiple UEs.

An example may be using the existing Recommended Bit Rate MAC CE as defined in 3GPP specification TS 38.321 v15.5.0. Multiple of these can be sent in a single MAC PDU if needed, or multiple can be sent distributed over multiple MAC PDUs.

Alternatively, a message could consist of a list of tuples: {LCID_i, UL/DL or upstream/downstream or UL/DL/SL_i, Data Rate recommendation_i}

Or a message could consist of a list of tuples: {UE-ID_k, LCID_i, UL/DL_i, Data Rate recommendation_i} where UE-ID is a short identifier for a specific Remote/Relay UE in the RAN, or for a specific Remote/Relay UE downstream of the message's sender (this would allow IDs to be encoded even shorter, in principle).

Or, a message could consist of a list of tuples: {LCID_i, UL/DL_i, Data Rate recommendation_i, Data Rate limit_i}

The above format examples can be wrapped in a MAC CE or transported via one of the other protocols described above.

In an embodiment, the base station (gNB) could decide based on received reports that a Relay UE or Remote UE needs an additional upstream Relay UE on top of its current one. Because if not, the desired data rate of one or more crucial data streams (e.g. high-priority, real-time, or low-latency data) cannot be met. To fulfill this need, the base station (gNB) may instruct a specific Relay UE or Remote UE to acquire an additional parent Relay UE or to initiate a replacement by new parent Relay UE that can provide more bandwidth (i.e. data rate).

In one set of embodiments, the base station (gNB) and its scheduler may control and/or influence a recommended data rate for one logical channel (LCID1) for at least one specific UE (e.g. UE1) that is directly connected to the base station (gNB), triggered by receiving new information about a (aggregate) desired data rate for another logical channel (LCID2) on a UE (e.g. UE2, where either UE1 may or may not equal UE2). The base station (gNB) or its scheduler may for example schedule less resources for LCID1 and more for LCID2 if UE2 for LCID2 indicates that more data rate is desired there, and vice versa, or schedule more resources for LCID1 and less for LCID2 if UE2 for LCID2 indicates less data rate is required/desired.

A related embodiment may be to send lower recommended data rate than previous on LCID1 if UE2 for LCID2 indicates that more data rate is desired there, and vice versa, or to send higher recommended data rate than previous on LCID1 if UE2 for LCID2 indicates less data rate is required/desired.

In the above examples, the sent recommendations may be respectively lower/higher because respectively less/more resources are available for LCID1 in above cases.

In a further embodiment, the Relay UE (e.g. first UE) may reduce data rate recommendation(s) to downstream UEs when its buffer fills above a threshold or may adapt its data rate recommendation(s) to downstream UE(s) based on its buffer status.

For example, if the total buffered data size (pending data upstream towards the base station (gNB)) exceeds a specified threshold the Relay UE may start a policy of reducing the recommended data rate to downstream UE(s). Or, the reduction of recommended data rate could be specific for one or more LCID(s) depending on the status of the upstream data buffer for a specific upstream LCID. When the total buffer size of the Relay UE has decreased again below the specified threshold, the Relay UE may start to apply its original policy again without any reduction of recommendation(s).

In some embodiments described earlier, a data rate recommendation has been initially created by a base station (gNB) and then sent to one or more Relay UEs. In this way, the data rate recommendation "trickles down" into the local part of the cellular network initiated by the base station (gNB).

However, other initiation mechanisms (e.g. RRC or SDAP or PDCP) for data rate recommendations and/or limits can be used.

There can also be other types of control messages from the core network, i.e., coming from any function in the core network that carry such information. Such other messages may be used to convey e.g. slice-specific data limits for uplink to be adhered to by a UE, or recommendations to follow by a UE.

The recommendation and/or limitation control messages sent to one or more downstream UE(s) may be based on received data rate recommendation/limit information and may be sent using another protocol than the one used to receive the recommendation/limit.

For example, the Recommended Bit Rate MAC CE or Sidelink Recommended Bit Rate MAC CE could be used to send a recommended data rate value to child UE(s) by the Relay UE (e.g. first UE), based on a limit sent through an extended SDAP protocol message. In this case, a recommendation is sent based on a limit value. Downstream UEs may be OoC without access to most base station functions and/or core network functions, e.g., they could be unable to use control plane messaging to/from a base station or to establish a PDU session with the core network. With this data rate recommendation solution, the OoC UEs can still receive data rate recommendations indirectly via the Relay UE and apply the recommendations to their upstream data.

Alternatively, the Relay UE (e.g. first UE) may send a limit value to downstream UE(s) based on above data rate limit information, e.g., using a newly defined Sidelink Bit Rate Limit MAC CE or similar.

A further way to potentially send a data rate limit/recommendation to a downstream UE is via the RRC protocol over Sidelink (SL), i.e., the PC5 interface.

An embodiment that may be used in at least a layer-2 (L2) or layer-3 (L3) single-hop relaying architecture for UE-to-Network (U2N) relay is described next. It defines a new Sidelink (SL-SCH) MAC CE called "SL-RBR" which stands for Sidelink Recommended Bit Rate MAC Control Element. The SL-RBR may be assigned a new 6-bits logical channel (LCID) value in the range 20-61, for example 61. The SL-RBR may have a fixed size of two octets. It may include one or more of the following fields:

Q: 'query' (1 bit): indicates whether this SL-RBR encodes a bit rate recommendation (Q=0) or whether it is a query (Q=1) for a bit rate recommendation. In the following, the name "SL-RBR" denotes SL-RBR with Q=0 and "SL-RBR-Q" denotes SL-RBR with Q=1 set.

LCID (6 bits): indicates a logical channel identity for which a bit rate is recommended, or for which a recommendation query is made, respectively for the cases Q=0 and Q=1.

UL/DL (1 bit): indicates whether this SL-RBR/SL-RBR-Q applies to an upstream (1) or downstream (0) data flow direction.

Bit Rate (6 bits): an index into Table 6.1.3.20-1 of TS 38.321 v16.3.0, encoding a bit rate value for recommendation (Q=0) or request (Q=1) respectively. The "request" value can be seen as a preference of a UE for a bit rate i.e. a requested rate.

X (1 bit): bit rate multiplier applicable (1) or not applicable (0). The multiplier, if applicable, may be applied to the Bit Rate value in a similar way as described in TS 38.321 v16.3.0 Section 6.1.3.20 using the same multiplication factor. This factor is configured by gNB using an optional parameter bitRateMultiplier-r16 that may be sent via RRC to UEs including the Relay UE and the Remote UE. As an alternative, a new parameter bitRateMultiplierSL may be defined that specifies a distinct multiplier for Sidelink communications.

R (1 bit): reserved bit, set to 0.

The Remote UE traffic is relayed by at least one particular logical channel between the Relay UE and the gNB. Such channel is here called a "proxy LCID" for the Remote UE. Such proxy LCID is used on the Uu interface, whereas the LCID directly used by the Remote UE over PC5 is a different logical channel and hence may have a different logical channel identifier (LCID). One proxy LCID could serve one, or multiple, Remote UEs depending on for instance a mapping of LCIDs used over Uu to LCIDs used over PC5 (and vice versa) that may be constructed by the Relay UE or by gNB (e.g. as part of an adaptation layer), or depending for instance on configuration sent by gNB, or on specific rules defined in 3GPP standards for logical channel selection in this case. Optionally the proxy LCID may also serve the Relay UE itself for transport of its own data traffic to/from gNB. In case of an L2 relay architecture, there may be procedures defined between a Remote UE, Relay UE, and gNB for the acceptance of a new Remote UE or Relay UE and subsequent setup of the RAN L2 end-to-end connection between Remote UE and gNB. In case of an L3 relay architecture, there may be procedures defined also for the acceptance of a new Remote UE or Relay UE and subsequent setup of a connection between Relay UE and gNB, and/or a connection between Relay UE and Remote UE. Aforementioned setup procedures may be used to assign a particular LCID as a proxy LCID for a particular Remote UE, or for a particular Sidelink LCID associated to a particular Remote UE.

A Relay UE serving one or more Remote UEs can send an SL-RBR to one or more of its Remote UE(s), triggered by specific events such as downlink reception of Recommended Bit Rate MAC CE from gNB for the proxy LCID (i.e. the ID of the logical channel used on Uu), or the receipt of SL-RBR-Q from a Remote UE. Which of the served Remote UEs are eligible for receiving a new SL-RBR in case the trigger is DL reception of Recommended Bit Rate MAC CE from gNB is determined by the set of Remote UEs associated to the particular proxy LCID value included in that received MAC CE from the gNB. Likewise, for queries, a Relay UE can send a Recommended Bit Rate Query MAC CE (indicating a proxy LCID) in uplink to its gNB, triggered by specific events such as timer expiry or reception of SL-RBR-Q from one or more of its Remote UEs. The LCID value to include in this MAC CE sent by the Relay UE to gNB is determined by the specific trigger conditions. For example, if the trigger is timer-based, the LCID value may be determined by the logical channel for which the triggered timer was created. Or for example, if the trigger was reception of SL-RBR-Q from one particular Remote UE, then the LCID value is determined typically as equal to the proxy LCID associated to that particular Remote UE.

A Relay UE could use one of several policies for distributing a received recommended bit rate to a set of one or more downstream Remote UEs. The received recommended bit rate message from gNB may include an LCID field, which may be used by the Relay UE as input parameter for executing the policy and/or selecting a particular stored policy. A policy may—as described in this document—be fixed in the Relay UE, or pre-configured, or dynamically configured by e.g. the gNB using e.g. data sent over the RRC protocol to the Relay UE. Typical advantageous policies for the present embodiment and its variants are:

1. Fair distribution—the Relay UE can divide the bit rate evenly across the number N of Remote UEs that are associated to the same proxy LCID (where N may be 1). In this case gNB preferably recommends a rate value that is for example divisible by N and thus allows encoding of the exact division result value in an SL-RBR.

2. Distribution proportional to requested bit rates—the Relay UE can divide the bit rate approximately in proportion to the requested bit rate of each of N applicable Remote UE(s). The set of applicate UE(s) is typically all Remote UEs that share the same proxy LCID value. In case an applicable UE did not (yet) request a bit rate using SL-RBR-Q, the Relay can either determine it requires a fraction (1/N) of the total rate recommendation, or that it requires nothing (0) until it makes an explicit request. This determination algorithm may be configurable by gNB, or a default algorithm in the Relay UE, or depending on situational parameters (e.g. the number of Remote UEs served, data load, etc.).

3. Distribution to streaming data producers and/or consumers only—the Relay UE can keep track of the subset of Remote UEs for a particular proxy LCID that have in the past requested a data rate recommendation using SL-RBR. Only this subset of N members (where N may be 1) is used for further distribution of the data rate recommendation per policy 1 above.

4. Using historic bit rates—similar to policy 2 above, but instead of assuming a Remote UE that did not request a recommendation is using a fixed fraction, this policy uses an actual historic data rate observed by the Relay UE for that Remote UE. This assumes that the preference of that Remote UE is to continue data streaming like it had done in the past.

5. Distribution proportional to known quality indicators—the Relay UE stores a table that maps each downstream Remote UE to a quality indicator, e.g. a QoS value such as PQI. The Relay UE divides the aggregate bit rate recommendation preferably such that each downstream Remote UE receives at least a bit rate recommendation that complies with the quality indicator, i.e. it allows each Remote UE to meet its QoS requirements. Alternatively or additionally, the Relay UE may assign a larger share of the aggregate bit rate recommendation to those Remote UE(s) that have stricter QoS requirements as determined by their quality indicator, stricter meaning e.g. a PQI with a lower Default Priority Level as defined by TS 23.287, or a PQI with a lower maximum Packet Error Rate as defined by TS 23.287, or a higher bandwidth requirement.

6. Distribution adapted to current relay load—this policy aspect can be combined with one of the other policies. In this case, the Relay UE may lower the computed recommendation value to one or more Remote UE(s) based on an indication of current relay load, i.e. an internally computed indication that uses one or more variables, that describes the load on the Relay UE's resources due to its functions including e.g. user data transmission, user data reception, data relaying operations, computation, sensing operations. Examples of load indicators are device temperature, memory usage, battery energy consumption, memory buffer usage for relaying operations, CPU load percentage, resource availability percentage in a Sidelink resource pool, etc. Typically, the Relay UE would use such load indicator(s) to reduce the computed value for downstream Recommended Bit Rate more, when this load indication is higher. This allows the Relay UE to balance its service towards its Remote UEs against its own resource requirements and limitations.

7. Adapted to Remote UE link quality—this policy aspect can be combined with one of the other policies. The Relay UE will adapt a computed bit rate recommendation value based on the link quality or similar indicator of a link towards a particular Remote UE. For example, the Relay UE may determine that a particular link to a Remote UE has a low quality and therefore an effective bit rate to or from that Remote UE cannot exceed a certain determined threshold value. Then the Relay UE may decide to reduce the recommendation value that was computed per the policy and send the reduced value to the Remote UE.

A Relay UE could use one or more of several policies for aggregating multiple received bit rate recommendation queries (SL-RBR with Q=1) into a single uplink Recommended Bit Rate Query MAC CE with included request value that is sent to gNB. This policy may—as described in this document—be fixed in the Relay UE, or pre-configured, or dynamically configured by the gNB using data sent over the RRC protocol to the Relay UE. Typical advantageous policies for the present embodiment are:

1. Sum of requested bit rates—the Relay UE will sum any UL/DL-bit=0 requests received from Remote UEs that pertain to the same proxy LCID and send the approximate sum as one Recommended Bit Rate Query with UL/DL-bit=0 uplink to gNB; as well as sum any UL/DL=1 requests and send the approximate sum as one Recommended Bit Rate Query uplink to gNB with UL/DL=1. If the exact sum cannot be encoded as one of the allowed bit rate values using the 6 bits of the Bit Rate field, then the next-highest number for Bit Rate is selected by the Relay UE.

2. Sum of requested and historic bit rates—the Relay UE will sum requests like in policy 1 above, but in addition it uses historically observed actual data rates of one or more Remote UEs that did not send any SL-RBR-Q yet, or did not send it recently. These historic rates are added to the sum. This assumes that the preference of those Remote UE(s) that did not (recently) send a SL-RBR request is to continue data streaming like they had done in the past.

3. Adapted to current relay load—this policy aspect can be combined with one or more of the other policies. In this case, the Relay UE will lower the computed request value based on an indication of current relay load, i.e. an internally computed indication that uses one or more variables, that describes the load on the Relay UE's resources due to its functions including e.g. user data transmission, user data reception, data relaying operations, computation, sensing operations. Examples of load indicators are device temperature, memory usage, battery energy consumption, memory buffer usage for relaying operations, CPU load percentage, resource availability percentage in a Sidelink resource pool, etc. Typically, the Relay UE would use such load indicator(s) to reduce the computed request value for upstream Recommended Bit Rate Query more, when this load indication is higher. This allows the Relay UE to balance its service towards its Remote UEs against its own resource requirements and limitations.

4. Adapted to Remote UE link quality—this policy aspect can be combined with one or more of the other policies. The Relay UE will adapt a computed request value based on the link quality or similar indicator of a link towards a particular Remote UE. For example, the Relay UE may determine that a particular link to a Remote UE has a low quality and therefore an effective bit rate to or from that Remote UE cannot exceed a certain determined threshold value. If that Remote UE requests a bit rate higher than this threshold, the Relay UE can decide to reduce this value and then apply the policy using this reduced value. This is similar to case 3 but now the reduction is done for other reasons, and computed differently.

To limit the amount of SL-RBRs transmitted, a UE may use a timer bitRateQuerySIProhibitTimer similar to the existing timer bitRateQueryProhibitTimer in TS 38.321 to constrain the rate at which SL-RBR can be sent.

If a Relay UE does not have a transmission opportunity for SL-RBR to a particular Remote UE, it may keep the latest SL-RBR to be transmitted to that Remote UE in memory until a next transmission opportunity arises. Or alternatively, the Relay UE may calculate the optimal value for the SL-RBR to send just-in-time before a next transmission opportunity starts. In a first variant of this embodiment, the field Q is not present in the SL-RBR and SL-RBR-Q but rather two different LCID values are assigned for SL-RBR and SL-RBR-Q respectively. For example, value 61 for SL-RBR and value 60 for SL-RBR-Q. This has the advantage that it saves one bit of payload in the MAC CE, which may then be used for other purposes.

An alternative embodiment that can be used in at least a layer-2 (L2) single-hop relaying architecture for UE-to-Network (U2N) relay is described next. It defines SL-RBR just as in the previous embodiment and in addition also "RBR-R" which stands for Recommended Bit Rate for Relay MAC Control Element. The RBR-R is assigned a new DL-SCH logical channel (LCID or eLCID) value, for example 46 or 308. It also defines "RBR-R-Q" to denote a Recommended Bit Rate for Relay Query MAC Control Element. The RBR-R-Q is assigned a new UL-SCH logical channel (LCID or eLCID) value, for example 44 or 249. The RBR-R/RBR-Q may have a fixed size of four octets. It may include one or more of the following fields:

Remote-ID (16 bits): an identity of a Remote UE, encoded for example as (part of) an L2 identifier. This encodes the identity of the Remote UE that (in case of RBR-R-Q) queried for a bit rate recommendation towards the Relay UE or (in case RBR-R) is to be provided with a bit rate recommendation by the Relay UE.

SL-LCID (6 bits): indicates a SL logical channel identity associated to the Remote-ID identified Remote UE for which a bit rate is recommended in RBR-R, or for which a recommendation query is made for RBR-R-Q. Optionally, this field could be excluded in a further alternative embodiment; in this case a RBR-R/RBR-R-Q would pertain to all (active) SL LCIDs used between the Relay UE and the Remote-ID identified Remote UE.

UL/DL (1 bit): indicates whether this RBR-R/RBR-R-Q applies to an upstream (1) or downstream (0) data flow direction.

Bit Rate (6 bits): an index into Table 6.1.3.20-1 of TS 38.321 v16.3.0, encoding a bit rate value for recommendation (Q=0) or request (Q=1) respectively. The "request" value can be seen as a preference of a UE for a bit rate i.e. a requested rate.

X (1 bit): bit rate multiplier applicable (1) or not applicable (0). The multiplier, if applicable, may be applied to the Bit Rate value in a similar way as described in TS 38.321 v16.3.0 Section 6.1.3.20 using the same multiplication factor. This factor is configured by gNB using an optional parameter bitRateMultiplier-r16 sent via RRC to UEs including the Relay UE and the Remote UE. As an alternative, a new parameter bitRateMultiplierSL may be defined that specifies a distinct multiplier for Sidelink communications.

R (2 bits): reserved bit, set to 0. Optionally, a reserved bit may be used as a Remote-ID Extension bit indicating a larger Remote-ID address is included which is useful in case the short 16-bit Remote-ID identities of two Remote UEs would collide otherwise.

In case of an L2 relay architecture there may be a procedure between a Remote UE, Relay UE, and gNB for acceptance of a new Remote UE and setup of the RAN L2 end-to-end connection between Remote UE and gNB. Similarly, for an L3 relay architecture there may be a procedure for acceptance of a new Relay UE or Remote UE, or for setup of the connection between Relay UE and gNB over Uu, or for setup of the connection between Relay UE and Remote UE over PC5. Such procedure may also set up a "proxy LCID" as described in the previous embodiment. A Relay UE serving one or more Remote UEs can send an SL-RBR to one or more of its Remote UE(s), triggered by specific events such as downlink reception of RBR-R MAC CE from gNB, or the receipt of SL-RBR-Q from a Remote UE. Which of the served Remote UEs should receive a new SL-RBR in case the trigger is DL reception of RBR-R MAC CE from gNB is in most cases determined by the Remote-ID value indicated in that received MAC CE. Likewise, for queries, a Relay UE can send a RBR-R-Q MAC CE (indicating a Remote UE ID in the Remote-ID field) in uplink to its gNB triggered by specific events such as timer expiry, or reception of SL-RBR-Q from one or more of its Remote UEs. The SL-LCID value (if applicable) and Remote-ID value to include in this MAC CE sent to gNB is determined based on the identity of the Remote UE, and (if applicable) for which Sidelink LCID of that Remote UE a query is to be made to gNB. Typically, the Remote-ID would identify the same Remote UE that sent a triggering SL-RBR-Q to the Relay UE and the SL-LCID field (if applicable) would identify the Sidelink LCID indicated in that triggering SL-RBR-Q.

A Relay UE could use one of several downstream policies for distributing a received recommended bit rate further to a Remote UE. A policy may—as described elsewhere in this document—be fixed in the Relay UE, or pre-configured, or dynamically configured by the gNB using data sent over the RRC protocol to the Relay UE. Typical advantageous policies for the present embodiment are:

1. Best-effort distribution—send the SL-RBR as soon as possible when a MAC PDU to the destination Remote UE is being sent that has space available for inclusion of the SL-RBR.
2. Time-bound distribution—as policy 1, but in case no MAC PDU is being sent to the destination Remote UE within some configured time limit, create a new MAC PDU and send it to the Remote UE even if this PDU does not contain higher-layer data.
3. Lazy distribution—buffer the received recommendation locally until the destination Remote UE signals a SL-RBR-Q and/or a specific timer on the Relay triggers. Then, in response send the buffered recommendation using SL-RBR using policy 1 or 2.
4. Lazy distribution with gNB fallback—as policy 3, but in case the requested bit rate in SL-RBR-Q is higher than the buffered value, trigger a new RBR-R-Q to gNB and await the response RBR-R and then provide this new value to the Remote UE using policy 1 or 2.
5. Deltas-only distribution—use one of the other policies 1-4, and in addition suppress the sending of SL-RBR in case the recommendation value of that SL-RBR would be equal to the value that was previously sent to the same Remote UE using SL-RBR. Optionally, the suppression is not used if the last sending event was longer ago than a configured time interval.

A Relay UE could use one of several upstream policies for sending received bit rate recommendation queries (SL-RBR with Q=1) to gNB as RBR-R-Q queries. The policy may—as described elsewhere in this document—be fixed in the Relay UE, or pre-configured, or dynamically configured e.g. by the gNB e.g. using data sent over the RRC protocol to the Relay UE. Typical advantageous policies for the present embodiment are:

1. Best-effort sending—send RBR-R-Q as soon as possible after a triggering event, when a MAC PDU to the gNB is being sent that has space available for inclusion of this MAC CE.
2. Time-bound distribution—as policy 1, but also apply a time limit similar to downstream policy 2.
3. Deltas-only distribution—use one of the policies 1 or 2, and in addition suppress the sending of RBR-R-Q in case the bit rate value equals the value that was previously sent to the gNB using RBR-R-Q for the same Remote UE and same SL-LCID. Optionally, the suppression is not used if the last sending event was longer ago than a configured time interval.

To limit the amount of RBR-R-Qs transmitted, a UE may use a timer bitRateRelayQueryProhibitTimer similar to the existing timer bitRateQueryProhibitTimer in TS 38.321 to constrain the rate at which RBR-R-Q can be sent.

An advantage of this embodiment is that the gNB can determine in detail the bit rate recommendation for each Remote UE it serves, providing more control of recommendations to the gNB.

Yet another alternative embodiment is described below, based on the same principles as the previous embodiment applied to an L2 relaying architecture. The main difference in the present embodiment with respect to the previous one is that the SL-RBR and SL-RBR-Q are carried directly inside an adaptation header that is sent in communications between gNB and a Relay UE, instead of sending RBR-R and RBR-R-Q respectively. The adaptation header is a header of a protocol layer on the Uu interface that sits between the RLC and PDCP protocol layers as defined in TR 23.752 v1.0.0 Annex A. Note that the adaptation header is only used to wrap i.e. attached to PDCP PDUs that need to be relayed by the Relay UE. The adaptation header may be defined as a variable-length header such that it may include other information elements (IEs) such as MAC CEs that are to be sent over Sidelink (PC5 interface) to the UE indicated in a "destination UE identity" field or similar field of the adaptation layer, over a Sidelink channel (LCID) indicated in a "destination LCID" field or similar field of the adaptation layer. In particular, the adaptation header may contain at least one "length" field that indicates the entire length of the adaptation header or a length of the IE container only. The IE container may contain one, or optionally one or more, MAC CEs. Other data such as status reports or configuration settings related to the relaying operation may also be included as IEs in the IE container. When receiving such IE with MAC CE it is the responsibility of the Relay UE to determine the actual MAC CE to be sent to the destination UE over PC5, and to attempt to transmit the determined MAC CE to the destination UE over its PC5 connection with that UE. When doing this determination specifically for an included SL-RBR, the Relay UE may base its transmitted SL-RBR entirely on the fields as included in the SL-RBR in the IE container or it may adapt the recommended bit rate value (e.g. to a lower value in case it is heavily loaded, or lowering the value due to some other policy). Vice versa the Relay UE is responsible to receive SL-RBR-Q from Remote UEs and send such query (provided that there is MAC PDU space and triggering conditions allow it) to gNB embedded in an IE in the adaptation header. This allows gNB to send detailed recommendations as SL-RBR to specific Remote UEs as in the previous embodiment, and assist the Relay UE better with detailed recommendations upon which the Relay UE can make a better informed decision for its final recommendation(s) to Remote UE(s) and also it allows the gNB to receive all specific queries (SL-RBR-Q) coming from Remote UEs through the Relay UE thus getting more granular information. This has the same advantages as mentioned for the second embodiment, and in addition the advantage that new MAC CE type definitions on DL-SCH are not needed because the gNB may directly include SL-SCH MAC CEs within the IE container for DL packets and the Relay UE may directly include SL-SCH MAC CEs within the IE container for UL packets. It also has the additional advantage that the IE container in the adaptation header can also be used by gNB to send other types of SL MAC CEs in a relayed fashion to the Remote UE(s) without requiring the Relay UE to be able to know about and parse all these MAC CEs; which is useful in case e.g. new types of SL MAC CEs are introduced which a legacy Relay UE may not know about. Instead of using the adaptation header to carry the MAC CE message such as SL-RBR-Q, the Relay UE may also add an adaptation layer header to a received SL-RBR-Q message, e.g. after encapsulating it in a RLC/PDCP message.

Next, an embodiment is described that applies to the case where a Relay UE or Remote UE performs a procedure to let it be assigned to a new parent Relay UE while disconnecting from its current parent Relay UE, where both the old and new parent Relay UE are served by the same gNB directly or indirectly. This procedure is called here intra-gNB handover of the UE. This embodiment may be combined with any of the previous embodiments described. The trigger for starting the intra-gNB handover may be a message or instruction from the gNB to the UE or to its current parent Relay UE, or it may be a determination by the Relay UE itself that it needs to handover. In either case the parent Relay UE will be notified of the handover, or it will eventually notice the disconnection of the UE. This may be the trigger to redetermine the data rate recommendation(s) and/or limit(s) to any remaining downstream Relay or Remote UEs. In addition, optionally the gNB could at own initiative send a new data rate recommendation and/or limit to the (old) parent Relay UE, for example lowering the total amount due to the departure or imminent departure of the UE as a child UE. Also, optionally the parent Relay UE could at own initiative send a data rate recommendation query to its parent communication device (e.g. a gNB, or a Relay UE) to indicate it needs a new recommendation given the updated situation. The gNB may then respond to this query with an updated data rate recommendation and/or limit. Once the handed over UE has connected to its new parent Relay UE, it may optionally send a new data rate recommendation query to that parent in order to notify the new parent of its desired data rate and to request the data rate recommendation from the new parent. The parent Relay UE may respond directly to this request with a recommendation, or it may first send out a data rate recommendation query to its own upstream communication device (e.g. gNB, or Relay UE) to ensure that its upstream devices are also aware of the desired data rates of downstream devices in the new situation. In either case, the intent of this procedure is that the new parent Relay UE can send a new data rate recommendation to the handed over UE which is now attached to the new parent (as Remote UE or as Relay UE, or as both). Note that the UE may use other logical channel identifiers (e.g. different LCID values) with the new parent than the ones it used with the old parent, dependent on the method used for selection of these identifiers (e.g. it may be configured by gNB).

A similar embodiment to the above can be defined for the case of inter-gNB handover, that is, a procedure where a UE (either Relay UE or Remote UE) will leave its current parent Relay UE and will connect to a new parent Relay UE that is served by a different gNB, directly or indirectly. In this case the same behaviours as defined above can be used by the old parent Relay UE and the new parent Relay UE, as well as by the handed over UE.

For both intra-gNB handover and inter-gNB handover case, the (old) parent relay UE of a Remote UE may upon handover of the Remote UE to another parent relay UE (e.g. after receiving a signal (e.g. handover request) from the Remote UE or gNB informing the relay UE of the handover or triggered by the relay UE itself) or upon handover of a relay UE from one gNB to another gNB, send a message to the Remote UE and/or the old or new gNB and/or a core network function (such as AMF or SMF) with information about the logical channel assignment and/or the QoS configuration (e.g. QoS flows/filters/policies) related to those channels and/or the (most recent) data rate recommendation configuration and/or related policies and/or a list of recent messages related to data rate recommendation or data rate recommendation queries. This information may then be used by the Remote UE and/or the old or new gNB and/or the respective core network function to inform the new parent relay UE of the Remote UE and/or the new gNB, which can use this information to apply similar configuration/policies/ logical channels that the old parent relay UE applied for its relay communication with the Remote UE. This enables a smoother, quicker handover procedure.

Furthermore, in case of inter-gNB handover, the gNB to which the relay UE is connected before handover may send information about the logical channel assignment and/or the QoS configuration (e.g. QoS flows/filters/policies) related to those channels and/or the (most recent) data rate recommendation configuration and/or related policies and/or a list of recent messages related to recommended data rates or data rate recommendation queries related to the relay UE and/or its connected downstream UEs, to the new gNB to which the relay UE gets connected after handover.

To summarize, in cellular or other wireless networks, relay communication devices can be introduced to support an indirect network connection for remote communication devices in OoC areas to thereby extend access device coverage and increase available data capacity for communication devices that may not be in optimal coverage of an access device. For directly connected communication devices, mechanisms for bit rate recommendation, bit rate query and desired bit rate indication are defined. However, these existing mechanisms do not work for communication devices indirectly connected via a relay communication device. It is therefore proposed to determine a new data rate recommendation and/or limit for one or more downstream communication devices at least partly based on an identity of a logical channel indicated in a received recommendation and/or limit.

While the invention has been illustrated and described in detail in the drawings and foregoing description, such illustration and description are to be considered illustrative or exemplary and not restrictive. The invention is not limited to the disclosed embodiments. The proposed enhanced rate recommendation or limitation can be implemented in all types of wireless networks where relays are used. E.g., it can be applied to devices communicating using cellular wireless communication standards, specifically the $3^{rd}$ Generation Partnership Project (3GPP) 5G specifications.

Thus, the wireless communication devices can be different types of devices, e.g. mobile phones, vehicles (for vehicle-to-vehicle (V2V) communication or more general vehicle-to-everything (V2X) communication), V2X devices, IoT hubs, IoT devices, including low-power medical sensors for health monitoring, medical (emergency) diagnosis and treatment devices, for hospital use or first-responder use, virtual reality (VR) headsets, etc.

Furthermore, the invention can be applied in medical applications or connected healthcare in which multiple wireless (e.g. 4G/5G) connected sensor or actuator nodes participate, in medical applications or connected healthcare in which a wireless (e.g. 4G/5G) connected equipment consumes or generates occasionally a continuous data stream of a certain average data rate, for example video, ultrasound, X-Ray, Computed Tomography (CT) imaging devices, real-time patient sensors, audio or voice or video streaming devices used by medical staff, in general IoT applications involving wireless, mobile or stationary, sensor or actuator nodes (e.g. smart city, logistics, farming, etc.), in emergency services and critical communication applications, in V2X systems, in systems for improved coverage for 5G cellular networks using high-frequency (e.g. mmWave) RF, and any other application areas of 5G communication where relaying is used.

Moreover, while aforementioned embodiments typically describe creation of a single new MAC/RLC logical channel to carry relay data for a downstream communication device, similar embodiments are possible where two or more logical channels are created to carry relay data for the downstream communication device, e.g. to handle situations where a single radio bearer requires two or more MAC/RLC logical channels. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 4 and 5 can be implemented as program code means of a computer program and/or as dedicated hardware of the related communication device or access device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for controlling scheduling of communication resources to communication devices at a relay communication device in a wireless network, the apparatus comprising:
   a computing unit; and
   a non-transitory memory storing program code that, when executed by the computing unit, causes the computing unit to:
   receive, from an access device of the wireless network or from an upstream relay communication device of the relay communication device, a received data rate recommendation and/or limit providing an identity of a logical channel, wherein the received data rate recommendation and/or limit comprises one of:
      an aggregate data rate recommendation and/or limit indicating the logical channel pertaining to at least two communication devices,
      an aggregate data rate recommendation and/or limit indicating the logical channel pertaining to at least two logical channels of a communication device, or
      a data rate recommendation and/or limit for the logical channel that has been assigned to one or more downstream communication devices by the relay communication device;
   determine a new data rate recommendation and/or limit for one or more downstream communication devices at least partly based on the identity of the logical channel; and
   transmit the determined new data rate recommendation and/or limit to at least one of the one or more downstream communication devices.

2. The apparatus of claim 1, wherein the program code further causes the computing unit to determine the new data rate recommendation and/or limit to be less than or equal to the received data rate recommendation and/or limit.

3. The apparatus of claim 1, wherein the received data rate recommendation and/or limit comprises indicator data that indicates whether the received recommendation and/or limit applies to an upstream data flow or a downstream data flow.

4. The apparatus of claim 1, wherein the program code further causes the computing unit to send to the access device or the upstream relay communication device of the relay communication device a request for an aggregate desired data rate for a logical channel.

5. The apparatus of claim 4, wherein the request for the aggregate desired data rate is triggered by and at least partly based on at least one request for a desired data rate received from one of the one or more downstream communication devices.

6. The apparatus of claim 1, wherein the program code further causes the computing unit to receive a request for a desired data rate for a logical channel from one of the one or more downstream communication devices, to determine based on the received request a data rate recommendation and/or limit for the logical channel, and to respond to the request with the determined data rate recommendation and/or limit.

7. The apparatus of claim 1, wherein the program code further causes the computing unit to look up in an internal table of the relay communication device a corresponding downstream communication device and an identity of another logical channel for which to send a new data rate recommendation and/or limit to the downstream communication device in response to the received data rate recommendation and/or limit indicating the identity of the logical channel.

8. The apparatus of claim 7, wherein the program code further causes the computing unit to create an additional logical channel on a wireless link with the access device or the upstream relay communication device when a new logical channel has been created for a communication link with one of the one or more downstream communication devices.

9. The apparatus of claim 7, wherein the internal table is configured to map the identity of the logical channel between the relay communication device and the access device, or between the relay communication device and the upstream relay communication device, to a plurality of identities of logical channels between the relay communication device and the one or more downstream communication devices.

10. The apparatus of claim 1, wherein the data rate recommendation and/or limit is transmitted using at least one of Medium Access Control protocol, Radio Link Control protocol, adaptation protocol carrying Packet Data Convergence Protocol data, Packet Data Convergence Protocol, Radio Resource Control protocol, and Service Data Adaptation Protocol.

11. The apparatus of claim 1, wherein the program code further causes the computing unit to collect information about at least one desired data rate received from the one or more downstream communication devices, to transmit the collected information to the upstream relay communication device or to the access device, to receive the received data rate recommendation and/or limit from the upstream relay communication device or the access device in response to the collected information, and to distribute the received data rate recommendation and/or limit at least partially among the one or more downstream communication devices using a predetermined policy.

12. The apparatus of claim 11, wherein the program code further causes the computing unit to select the predetermined policy based on at least one of a quality indicator of a logical channel of the relay communication device, a number of downstream communication devices of the relay communication device, a number of upstream communication devices of the relay communication device, a type of downstream communication device, a policy selection information received from an upstream communication device or the access device, a quality of service identifier, a network slice identifier, or a buffer status of the relay communication device.

13. The apparatus of claim 1, wherein the program code further causes the computing unit to determine a further new data rate recommendation and/or limit for one or more downstream communication devices triggered by loss of a communication link between the relay communication device and at least one other communication device, or triggered by a determination that said communication link is to be stopped; and transmit the further new data rate recommendation and/or limit to at least one downstream communication device.

14. The apparatus of claim 1, wherein the apparatus is the relay communication device for the wireless network.

15. A wireless communication system comprising the relay communication device according to claim 14 and the access device, wherein the access device is configured to receive from the relay communication device an aggregate desired data rate for the logical channel, and to determine based on an identity of the logical channel for which downstream communication devices the aggregate desired data rate applies.

16. The apparatus of claim 1, wherein the program code further causes the computing unit to look up in an internal table of the relay communication device an identity of another logical channel, for which to send a new request for a desired data rate to the access device or to the upstream relay communication device of the relay communication device, in response to a request for the desired data rate received from one of the one or more downstream communication devices, wherein the request indicates the identity of the logical channel.

17. The apparatus of claim 16, wherein the program code further causes the computing unit to create an additional logical channel on a wireless link with the access device or the upstream relay communication device when a new logical channel has been created for a communication link with one of the one or more downstream communication devices.

18. The apparatus of claim 16, wherein the internal table is configured to map the identity of the logical channel between the relay communication device and the access device, or between the relay communication device and the upstream relay communication device, to a plurality of identities of logical channels between the relay communication device and the one or more downstream communication devices.

19. A method of controlling scheduling of communication resources to communication devices in a wireless network, the method comprising:

receiving, from an access device or from an upstream relay communication device of the wireless network a received data rate recommendation and/or limit providing an identity of a logical channel, wherein the received data rate recommendation and/or limit comprises one of:

an aggregate data rate recommendation and/or limit indicating the logical channel pertaining to at least two communication devices, an aggregate data rate recommendation and/or limit indicating the logical channel pertaining to at least two logical channels of a communication device, or a data rate recommendation and/or limit for the logical channel that has been assigned to one or more downstream devices by the relay communication device;

determining a new data rate recommendation and/or limit for one or more downstream communication devices at least partly based on the identity of the logical channel; and transmitting the determined new data rate recommendation and/or limit to at least one of the one or more downstream communication devices.

20. A non-transitory computer readable medium storing computer code for controlling scheduling of communication resources to communication devices at a relay communication device in a wireless network, wherein when executed by a computing unit, the computer code causes the computing unit to:

receive, from an access device of the wireless network or from an upstream relay communication device of the relay communication device, a received data rate recommendation and/or limit providing an identity of a logical channel, wherein the received data rate recommendation and/or limit comprises one of:

an aggregate data rate recommendation and/or limit indicating the logical channel pertaining to at least two communication devices, an aggregate data rate recommendation and/or limit indicating the logical channel pertaining to at least two logical channels of a communication device, or a data rate recommendation and/or limit for the logical channel that has been assigned to one or more downstream communication devices by the relay communication device;

determine a new data rate recommendation and/or limit for one or more downstream communication devices at least partly based on the identity of the logical channel; and transmit the determined new data rate recommendation and/or limit to at least one of the one or more downstream communication devices.

* * * * *